(12) United States Patent
Numata et al.

(10) Patent No.: US 6,829,031 B2
(45) Date of Patent: Dec. 7, 2004

(54) LIQUID CRYSTAL DISPLAY APPARATUS AND OPTICAL DEVICE FOR USE THEREIN

(75) Inventors: Toru Numata, Yokohama (JP); Yasuo Otsuka, Chigasaki (JP); Mikio Shiraishi, Yokohama (JP); Koji Hirata, Yokohama (JP); Naoyuki Ogura, Machida (JP); Shigeru Inaoka, Yokohama (JP); Kazunari Nakagawa, Ebina (JP); Shigeru Mori, Chigasaki (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 10/337,400

(22) Filed: Jan. 7, 2003

(65) Prior Publication Data
US 2003/0098944 A1 May 29, 2003

Related U.S. Application Data

(63) Continuation of application No. 09/886,151, filed on Jun. 22, 2001, now Pat. No. 6,535,267, which is a continuation of application No. 09/168,921, filed on Oct. 8, 1998, now Pat. No. 6,256,083.

(30) Foreign Application Priority Data

| Oct. 13, 1997 | (JP) | 9-278813 |
| Oct. 13, 1997 | (JP) | 9-278814 |
| Oct. 13, 1997 | (JP) | 9-278815 |

(51) Int. Cl.[7] .................................... G02F 1/1333
(52) U.S. Cl. .................... 349/161; 349/9; 353/54
(58) Field of Search .................. 349/161, 8, 9; 353/54

(56) References Cited

U.S. PATENT DOCUMENTS

| 5,032,021 A | | 7/1991 | Kanatani et al. | |
| 5,105,265 A | * | 4/1992 | Sato et al. | 348/757 |
| 5,168,351 A | | 12/1992 | Bradley et al. | |
| 5,170,195 A | | 12/1992 | Akiyama et al. | |
| 5,179,312 A | | 1/1993 | Vriens et al. | |
| 5,631,750 A | * | 5/1997 | Minoura et al. | 349/110 |
| 5,758,956 A | * | 6/1998 | Bornhorst et al. | 362/294 |
| 5,812,215 A | * | 9/1998 | Yamada et al. | 348/825 |
| 5,835,179 A | | 11/1998 | Yamanaka | |
| 6,256,063 B1 | | 7/2001 | Numata et al. | |

FOREIGN PATENT DOCUMENTS

| JP | 01209482 A | * | 8/1989 | G09F/9/00 |
| JP | 01265226 A | * | 10/1989 | G02F/1/133 |
| JP | 01265227 A | * | 10/1989 | G02F/1/133 |
| JP | 01314288 A | * | 12/1989 | G09F/9/00 |
| JP | 2-90881 | | 7/1990 | |
| JP | 04177386 A | * | 6/1992 | G09F/9/00 |
| JP | 05080321 A | * | 4/1993 | G02F/1/1335 |

* cited by examiner

Primary Examiner—Kenneth Parker
(74) Attorney, Agent, or Firm—Mattingly Stanger & Malur, P.C.

(57) ABSTRACT

For obtaining both high brightness under condition of small-sized and simplified structure and suppression of increase in temperature of liquid crystal display elements and polarizing elements, in a liquid crystal display apparatus, comprising: a liquid crystal display element 2 for converting light from a light source into display picture depending on a driving signal; an optical projection system 1b containing a first optical element 1a and for projecting said light signal toward an object of projection; exit side polarizing elements 3b; a holding member 6 for holding them with the liquid crystal display element 2; and cooling medium 5; incident side polarizing elements 3a, wherein, a space is defined by either one of the incident side polarizing elements 3a and the liquid crystal display element 2, the first optical element 1a, between the liquid crystal display element 2 and the first optical element 1a, and the holding member 6, and said space is filled up with the cooling medium 5.

2 Claims, 15 Drawing Sheets

LIQUID CRYSTAL DISPLAY APPARATUS AND OPTICAL DEVICE FOR USE THEREIN

This is a continuation application of U.S. Ser. No. 09/886,151, filed Jun. 22, 2001, now U.S. Pat. No. 6,535,267 which is a continuation application of U.S. Ser. No. 09/168,921, filed Oct. 8, 1998, now U.S. Pat. No. 6,256,083.

BACKGROUND OF THE INVENTION

1. Field of the Invention

The present invention relates to a liquid crystal display apparatus for projecting a picture on a screen with use of a liquid crystal display element, including such as a liquid crystal projector, a liquid crystal television, a projection type display device, and so on, and also relates to an optical device for use therein.

2. Description of Prior Art

Conventionally, in a display apparatus for projecting a picture on a screen with use of a liquid crystal display element, upon the liquid crystal display element of such as a liquid crystal panel or the like, a light is irradiated from a light source, such as a light bulb, etc., and that penetrating or transmitting through it is projected on the screen. And, by adjusting or regulating an amount or quantity of polarization at each pixel in the liquid crystal element, the display is performed or accomplished.

In such the liquid crystal display apparatus, upon a requirement from a user of obtaining a good projection picture even in a bright circumstance or place, conventionally, an attempt was made to rise up an optical output of the projected picture has been tries by enhancement in a brightness of the light source and/or by improvement in an utility efficiency of the light beam thereof. For instance, with a technology described in Japanese Patent Laying-Open No. Sho 63-197913 (1988), there are utilized a polarization conversion element which comprises a polarized light separation means for dividing or separating an irregular polarized light from the light source into two (2) polarized lights being orthogonal to each other, and a polarization direction rotating means for rotating one of the polarized lights separated into a direction consistent with that of the other polarized light, thereby improving or increasing the utility efficiency of the light.

By the way, in the liquid crystal display apparatus as mentioned in the above, within the light emitted from the light source, the light except that being projected finally is absorbed into the liquid crystal display element and optical elements and so on, in periphery thereof, and it comes into heat. Therefore, the liquid crystal display element and the optical elements and so on in the periphery thereof are heated therewith. In particular, the rise-up in the output of the projection light, for purpose of increasing the brightness of the light source and/or of improving the utility efficiency of the light, results into the increase in light amount being incident upon the liquid crystal display element, and also leads to the increase in the heat generation of the liquid crystal display element and polarizing plates. Further, in a case where such the polarization conversion element is used within an optical system reaching from the light source until the polarizing element at an incidence side, the polarized lights are aligned equally in the polarization direction thereof, the amount of heat generation becomes large in the polarizing element at a light exit side when black is displayed totally all over the display.

On the other hand, the liquid crystal display element is, in general, constructed with a driving element of semiconductor and optical function parts or elements, including such as the liquid crystal, and so on. Those, for keeping any one of them function normally, must be kept at temperature lower than a predetermined value (less than 60° C., for example). Therefore, cooling is necessary for the liquid crystal display element. As a cooling method for this kind, there were made many proposals in methods of it.

As a conventional art relating to the cooling of the liquid crystal display element, for instance, an example which is described in Japanese Patent Laying-Open No. Hei 3-174134 (1991) is already known. In this conventional art, one of a pair of polarizing plates and the liquid crystal panel as the liquid crystal display element are disposed, being closely contacted with a cooler which contains a cooling liquid hermetically therein. The cooler is hermetically constructed with a frame work and two (2) pieces of transparent plates which closes or covers on both side surfaces of the frame work, and the polarizing plate mentioned above and the liquid crystal panel are closely contacted with the transparent plate, respectively. A part of a heat pipe is inserted into the cooler, and other portion protruding outside the cooler is provided with radiator fins. The heat in the liquid crystal panel and the polarizing panel is transferred to the cooler, further passing through the cooling liquid and the heat pipe, and then it is radiated from the radiator fins to an outside of the cooler.

Further, in the display apparatus described in the above, a part of the light passing through the liquid crystal display element sometimes may happen to be reflected by the optical element, such as a projection lens, behind the liquid crystal element, thereby coming back to the liquid crystal display element. Such the reflection light comes to be a cause of lowering in quality of the projection picture, in particular, such as decrease in contrast thereof.

As a conventional technology for suppressing the decrease in the contrast due to the reflection light from the optical element behind of the liquid crystal display element, other than a measure of improving the transparency (or transmission coefficient) by coating the optical element, there is known another technology which is described in Japanese Patent Laying-open No. Hei 6-110055, for example. With this conventional technology, a so-called $\lambda/4$ plate is positioned between the polarizing plate at the light exit side and the projection lens. The light penetrating through the liquid crystal panel and the polarizing plate at the light exit side reaches through the $\lambda/4$ plate to the projection lens. A portion of this incident light is reflected by the projection lens and comes back into a direction of the liquid crystal panel. At this moment, the reflected light passes through the $\lambda/4$ plate two (2) times after passing through the polarizing plate at the light exit side, on ways of go and back. Therefore, it is rotated by 90 degree in the polarization direction thereof, comparing to that of it when passing through the $\lambda/4$ plate previously. Therefore, the reflection light is unable to pass through the polarizing plate at the light exit side, thereby being absorbed totally therein.

With the conventional technology for protecting the liquid crystal display element from the heating, since the one of the polarizing plates and the liquid crystal display element are positioned so that they are closely contacted with the transparent plates of the cooler which contains the cooling liquid hermetically therein, there are laying two (2) pieces of the transparent plates and the cooling liquid between the polarizing plate and the liquid crystal display element. And, since there occurs reflection due to change in refractive index on each boundary surface of them, the penetration light is easily attenuated therewith.

Further, with this conventional technology, since it is constructed in such manner that the heat generation from the liquid crystal display element is radiated through a large number of heat transmission routes, i.e., the transparent plate—cooling liquid—heat pipe—radiator fins—peripheral atmosphere (outside air), it is easily affected in the cooling efficiency thereof by an integration or summation of thermal resistance, and is complex in the structure thereof. In particular, for achieving high brightness, there is a necessity of increasing the efficiency in heat radiation, therefore, large-sizing of the heat pipe and/or of the radiator fins are needed.

While, in the above-mentioned conventional technology for suppressing the decrease in the contrast, since it has such the construction that the reflection light from the projection lens is absorbed with the polarizing plate at the light exit side, that polarizing plate at the light exit side is heated up more easily. This heating-up results into a cause of thermal deterioration (including deformation) of the polarizing plate at the light exit side. Further, additional provision of the $\lambda/4$ plate brings an increase in the number of the optical parts and complexity in the structure thereof.

SUMMARY OF THE INVENTION

An object of the present invention is, therefore, to provide a liquid crystal display apparatus and an optical device for use therein, achieving a high brightness of picture with a small-sized and simplified structure, as well as suppression of increase in temperature of the liquid crystal display element and the polarizing elements therein.

For achieving the above-mentioned object, in accordance with the present invention, there is provided a liquid crystal display apparatus, comprising:

an optical source system for emitting projection light;

a liquid crystal display portion, for receiving the emission light from said optical source of the optical system and for generating a picture to be projected depending upon a given driver signal;

an optical projection system, including a first optical element which receives a light emitted from said liquid crystal display portion, and for projecting the light emitted from said liquid crystal display portion towards an projection object, wherein said liquid crystal display portion comprises:

a liquid crystal display element for generating the picture;

an incident side polarizing element being positioned at an incident side of said liquid crystal display element;

an exit side polarizing element being positioned at an exit side of said liquid crystal display element;

a holding member for holding at least the liquid crystal display element, the exit side polarizing element and said first optical element; and a cooling medium, wherein either one of said incident side polarizing element or said liquid crystal display element, said first optical element and said holding member define a space between said liquid crystal display element and said first optical element, and said cooling medium is filled up within said space.

Further, in accordance with the present invention, there is provided a liquid crystal display apparatus, comprising:

an optical source system for emitting projection light;

a plurality of liquid crystal display portions, for receiving the emission light from said optical source of the optical system and for generating a picture to be projected depending upon a given driver signal;

an optical projection system for composing and for projecting the light emitted from said plurality of liquid crystal display portions towards an projection object, wherein:

said optical source system has a light source and an optical separation system for dividing and emitting the light emitted from the light source towards said plurality of liquid crystal display portions; and said optical projection system has a first optical element for composing lights emitted from said plurality of liquid crystal display portions and a second optical element for projecting the light composed, and further, each of said liquid crystal display portions comprises:

a liquid crystal display element for generating the picture;

an incident side polarizing element being positioned at an incident side of said liquid crystal display element;

an exit side polarizing element being positioned at an exit side of said liquid crystal display element;

a holding member for holding at least the liquid crystal display element, the exit side polarizing element and said first optical element in each of said liquid crystal display portions; and a cooling medium for cooling, wherein either one of said incident side polarizing element or said liquid crystal display element, said first optical element and said holding member define a space between said liquid crystal display element and said first optical element, and said cooling medium is filled up within said space.

In this instance, said holding member is provided for each of said liquid crystal display portions, and the space within which said cooling medium is filled up is defined for each of said liquid crystal display portions.

Alternatively, said holding member is provided in common for said liquid crystal display portions, and the space within which said cooling medium is filled up is defined as a one space as a whole for said liquid crystal display portions.

Furthermore, in accordance with the present invention, there is provided a liquid crystal display apparatus, comprising:

an optical source system for emitting projection light;

a plurality of liquid crystal display portions, for receiving the emission light from said optical source of the optical system and for generating a picture to be projected depending upon a given driver signal;

a projection optical system for composing and for projecting the light emitted from said plurality of liquid crystal display portions towards an projection object, wherein:

said optical source system has a light source and an optical separation system for dividing and emitting the light emitted from the light source towards said plurality of liquid crystal display portions; and said optical projection system has a first optical element for composing lights emitted from said plurality of liquid crystal display portions and a second optical element for projecting the light composed, and further, each of said liquid crystal display portions comprises:

a liquid crystal display element for generating the picture;

an incident side polarizing element being positioned at an incident side of said liquid crystal display element;

an exit side polarizing element being positioned at an exit side of said liquid crystal display element;

a holding member for holding at least the liquid crystal display element, the exit side polarizing element and said second optical element; and a cooling medium for cooling, wherein said holding member is provided in common for said liquid crystal display portions, as well as, in each of said liquid crystal display portions, either one of said incident side polarizing element or said liquid crystal display element, said second optical element and said holding member define a space between said liquid crystal display element and said second optical element, the space within which said cooling medium is filled up is constructed as one space as a whole for the liquid crystal display portions, and said cooling medium is filled up within said space.

Here, said first optical element can be so constructed that it is received within said space.

Moreover, in accordance with the present invention, there is provided an optical device, including a liquid crystal display element within an optical path, comprising:

an incident side polarizing element positioned at an incident side of said liquid crystal display element;

an exit side polarizing element positioned at an exit side of said liquid crystal display element;

fixing means for fixing said incident side polarizing element, said liquid crystal display element and said exit side polarizing element;

cooling medium; and holding means for holding said cooling medium under a condition of contacting with said exit side polarizing element.

In each invention in the above, according to the present invention, further, the following embodiments can be applied in appropriate.

a) said exit side polarizing element is positioned at an incident surface of said first optical element.

b) said exit side polarizing element is fixed on a surface at an exit side of said liquid display element.

c) said exit side polarizing element is located between said liquid crystal display element and said first optical element and positioned under condition of being apart from both of them.

d) said holding member has openings at the incident side and the exit side, respectively, and further, at said incident side opening is installed any one of said incident side polarizing element and said liquid crystal display element, and at said exit side opening is installed said first optical element.

e) at the incident side opening of said holding member is installed said incident side polarizing element, and said liquid crystal display apparatus is held by said holding member under condition that the cooling medium lies on both surfaces at the incident side and the exit side thereof.

f) at the incident side opening of said holding member is installed said liquid crystal display element, and said liquid crystal display apparatus is held by said holding member under condition that the cooling medium lies on a surfaces of the incident side thereof.

g) said liquid crystal display portion is held by said holding member under condition that at least said exit side polarizing element contacts with said cooling medium.

h) said cooling medium has a refractive index near to that of said exit side polarizing element.

i) the refractive index of said cooling medium lies within a range from 1.2 to 1.7.

j) said holding member is made of metal and provided with a heat radiation fin.

k) said holding member is made of metal and provided with a pressure adjusting mechanism.

l) said optical source system comprises, an optical source, and an element for converting the light projected from the light source in the polarization thereof, so that the incident light upon said incident side polarizing element comes to be a polarized light including a polarization component being in parallel to a polarization direction of said incident side polarizing element.

With such the liquid crystal display apparatus, it is possible to suppress the increase in temperature of the liquid crystal display element and the polarizing element(s), and also to suppress the change in the refractive index in the optical path at the exit side of the liquid crystal display element down to small.

With suppressing the change in the refractive index down to small, the light reflected back to the liquid crystal display means is reduced down. As a result, high brightness of the picture is accomplished. Further, since there is no necessity of a special optical parts or element such as the λ/4 plate, and since the structure for the cooling can be simplified with ease and has high efficiency, the apparatus can be small-sized and simplified in the construction as a whole.

DETAILED DESCRIPTION OF PREFERRED EMBODIMENTS

Hereinafter, embodiments of a liquid crystal projector according to the present invention will be fully explained by referring to the attached drawings.

As an embodiment described here is in a case of a liquid crystal projector.

First, a first to third embodiments of the present invention will be explained by referring to attached FIGS. 1 through 6.

Figure 3:
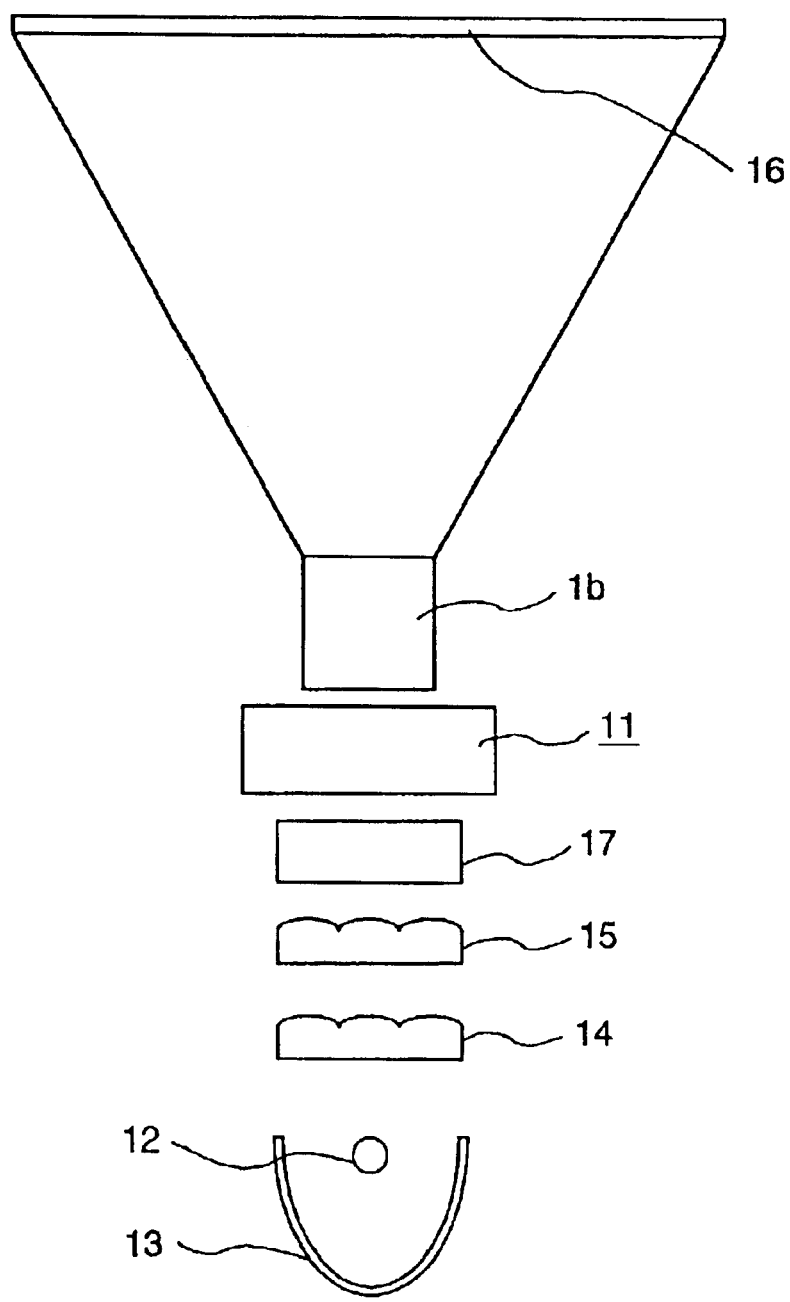
FIG. 3 is a view of showing an optical system of a single-plate type liquid crystal projector as a whole, relating to the first embodiment of the present invention.

FIG. 3 shows an example of structure of an optical system of a single-plate type liquid crystal projector. This single-plate type liquid crystal projector is constructed to have a light source such as a metal halide lamp, etc., a reflection mirror 13 for condensing the light emitted from the light source 12 into a constant direction, multiple lenses 14 and 15 assembling a large number of cell lenses, a polarization conversion element 17 for aligning the polarized light into a direction, a liquid crystal display portion 11 and a group of projection lenses 1b.

A picture displayed on the liquid crystal display portion 11 is projected through the projection lenses 1b upon a screen 16, thereby enlarged picture being displayed on the screen.

Here, those from the light source 12 until to the polarization conversion element 17 construct an optical source system for generating a projection light to be incident upon the liquid crystal display portion 11. Further, from a view point of structure, an optical projection system is formed with a first lens 1a and the projection lens group 1b which are included in the liquid crystal display portion 11.

The polarization conversion element 17 is able to convert an incident irregular polarization light into a polarized light of a particular polarization component with good efficiency. In the present embodiment, this polarization conversion element 17 is so constructed and positioned that a polarized light can be obtained which is almost in parallel to the polarization direction of an incident side polarizing element 3a.

Figure 1:
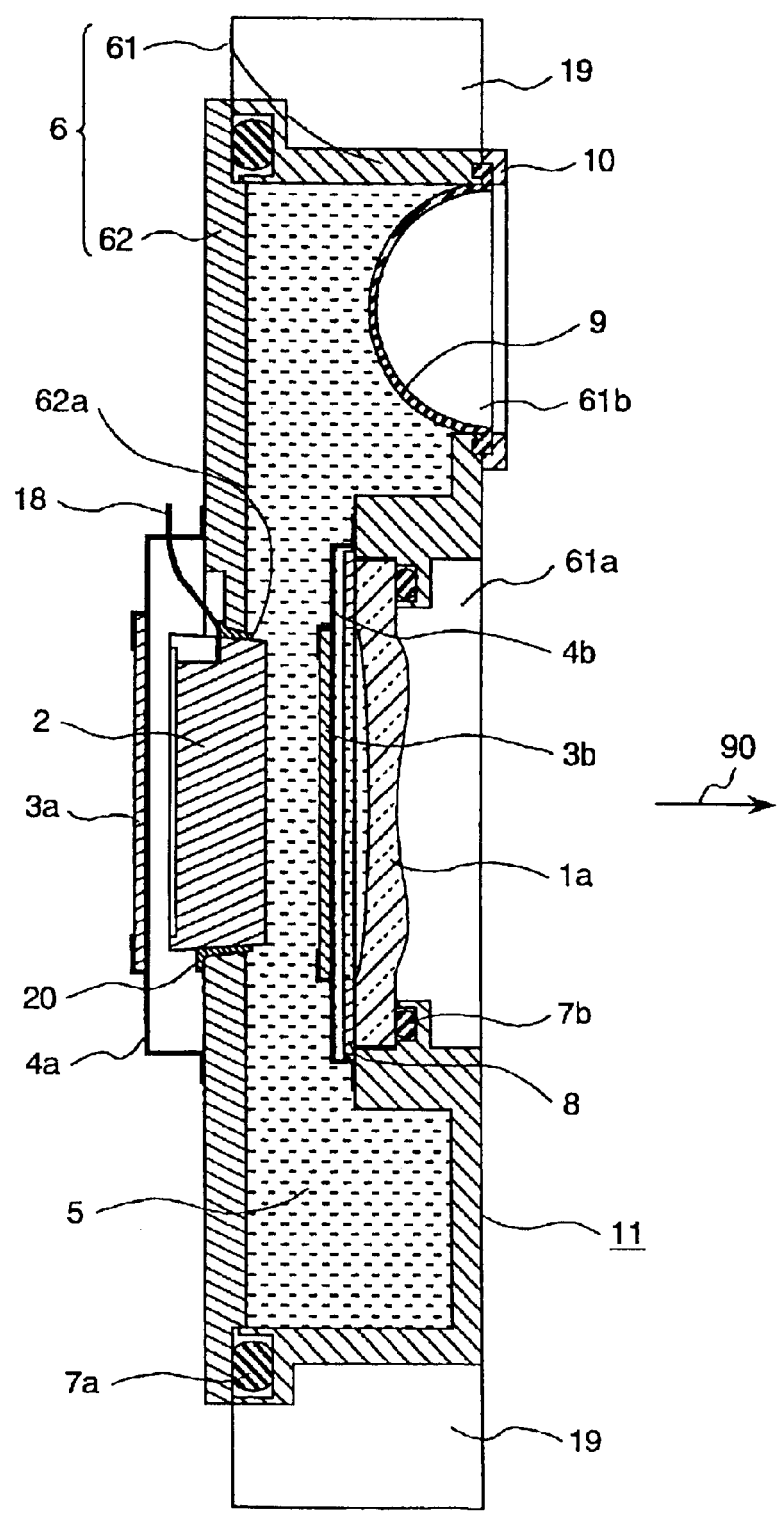
FIG. 1 is a cross-section view of showing structural elements of a liquid crystal display portion in accordance with a first embodiment of the present invention.

FIG. 1 is the cross-section view of showing structural elements of a liquid crystal display portion in accordance with a first embodiment of the present invention. The liquid crystal display portion 11 comprises a liquid crystal display element 2, an exit side polarizing element 3b, a first projection lens 1a, a holding member 6 for holding those and a cooling medium 5, and an incident side polarizing element 3a. Also, a reference numeral 90 indicates a progression direction of the light.

The first projection lens 1a is an optical element which constructing the projection lens group, with the above-mentioned projection lens group 1b, and is positioned at a side nearest to the liquid crystal display element 2 among the projection lens group. The incident side polarizing element 3a, the liquid crystal display element 2, the exit side polarizing element 3b and the first projection lens 1a are so positioned that they are almost in parallel to one another upon the light permeating surfaces thereof.

The holding member 6, in the present embodiment, has a function of holding the liquid crystal display element 2 and the exit side polarizing element 3b so as to contact with the cooling medium 5 for cooling thereof. Because of this, that member, with other members, also functions as a member for defining a cooling space within which the cooling medium 5 lies, i.e., a member constructing a container for the cooling medium 5. For those other members, in the present embodiment, the liquid crystal display element 2, the first projection lens 1a, a bellows 9 for pressure adjusting and so on function as the members defining the cooling space enclosing the cooling medium therein. The pressure adjusting bellows 9 absorbs a change in volume of the cooling medium 5. Further, with the holding member 6 is connected a heat radiation fin 19, thereby heat-exchanging the heat of the cooling medium 5 between an external fluid, such as an air, to cool down the cooling medium 5.

The holding member 6 has a first holding portion 61 of a concave shape and a second holding portion 62 of a plate-like shape. At an opening of the concave of the first holding portion 61, the second holding portion 62 is connected through an O-ring 7a. Further, in the second holding portion 62 is formed an incident side opening 62a which is sealed with the liquid crystal display element 2. Further, in the first holding portion 61, there are formed an exit side opening 61a which is sealed with the first projection lens 1a and an opening 61b which is sealed with the pressure adjusting bellows 9. Both the incident side opening 62a and the exit side opening 61a have such sizes that they will not interrupt the incident light and exit light into/from the liquid crystal display element 2 therewith.

In the incident side opening 62a is inserted the liquid crystal display element 2, with press-fitting an elastic body 20 in an aperture therebetween. In the exit side opening 61a is inserted the first projection lens 1a, and is press-contacted through the O-ring 7b.

The incident side polarizing element 3a is positioned with keeping a constant distance between the liquid crystal display element 2, and is supported by an incident side polarizing element holding frame 4a. On the other hand, the exit side polarizing element 3b is positioned on an incident surface of the first projection lens 1a, and is supported by an exit side polarizing element holding frame 4b. Here, both the incident side polarizing element holding frame 4a and the exit side polarization element holding frame 4b have such shapes that they will not interrupt the incident light upon the liquid crystal display element 2.

The pressure adjusting bellows 9 is attached at the opening of the holding member 6 through a pressure adjusting bellows pressing plate 10. The space which is surrounded by those liquid crystal display element 2, the holding member 6, the first projection lens 1a and the pressure adjusting bellows 9, is in a condition of being sealed liquid-tightly, in which the cooling medium 5 is filled up with.

For each of those elements mentioned above will be explained in more detail thereof.

Figure 2:
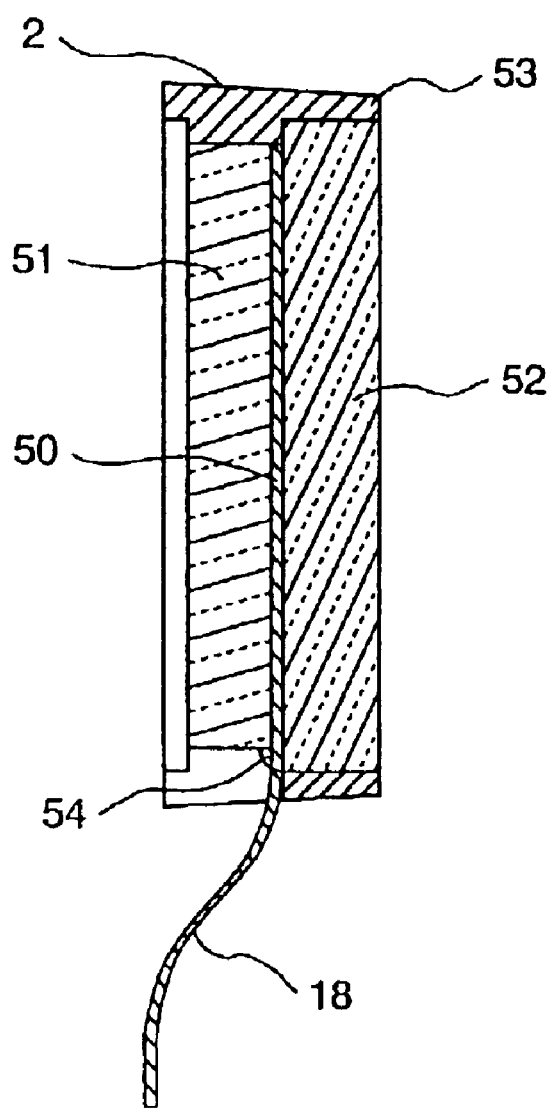
FIG. 2 is a cross-section view of showing structural elements of a liquid crystal display element for use in the present invention.

FIG. 2 shows the cross-section of the liquid crystal display element 2. As is shown in the figure, the liquid crystal display element 2 is constructed with a liquid crystal driven display portion 50, glass plates 51 and 52, and a liquid crystal display element frame 53. To the liquid crystal display element 2 is electrically connected to a signal line 18 for driving the liquid crystal display element. This liquid crystal display element driving signal line 18 is fixed to the liquid crystal display element 2 with adhesive 54, through which is transmitted a driving signal outputted from a driver circuit not shown in the figure.

The incident side polarizing element 3a and the exit side polarizing element 3b are formed in a plate-like shape, and are coated with glass or resin on one side surfaces thereof, respectively. Those incident side polarizing element 3a and the exit side polarizing element 3b have function of penetrating or transmitting through only a light component in a desired vibration direction. However, for those incident side polarizing element 3a and the exit side polarizing element 3b, a plurality polarizing elements can be applied.

For the cooling medium 5, a transparent fluid is used which has a refractive index being equal to or more than 1.2 and is equal to or less than 1.7. As the transparent fluid in a range from 1.2 to 1.7 in the refractive index, for example, there are listed an inactive liquid of fluoride (refractive index 1.25–1.3), ethylene glycol (refractive index 1.43), glycerin (refractive index 1.47), and aqueous solution and glycerin-ethylene glycol liquid mixture of those, etc.

Preferably, the refractive index of the cooling medium 5 is nearly equal to the refractive index of the optical element which contacts with the cooling medium 5 on an optical path, such as the liquid crystal display element 2 and the exit side polarizing element 3b. Here, the refractive index of the optical glass or plastic which is used in the liquid crystal display element 2, the exit side polarizing element 3b and the first projection lens, and so on, is bout 1.4–1.5. Since glycerin-ethylene glycol liquid mixture is 1.45 in the refractive index thereof, it is preferable as the cooling medium 5. Of course, if satisfying the above condition, also other materials which are not listed here can be used.

By selecting the cooling medium 5 in such manner, a difference in the refractive index upon the boundary surface between the liquid crystal display element 2 and the cooling medium 5, and upon the boundary between the cooling medium 5 and the exit side polarizing element 3b comes to be small. Thereby, the reflection upon those boundary surfaces, and also the decrease in the contrast due to the reflection light coming back into the liquid crystal display element, can be suppressed.

The holding member 6 is made of metal being superior in thermal conductivity, such as, Fe, Cu, Al, Mg, etc. or materials containing them therein. In a holding portion 62 which constructs the holding member 6, there is provided an incident side opening of about rectangular shape which is larger than a display pixel region of the liquid crystal display element 2. In this opening, the liquid crystal display element 2 is inserted, and it is fixed by press fitting of the elastic body 20 into an aperture therebetween. On a while, in the holding portion 61 is provided an exit opening 61a of a circular shape which is nearly equal to an effective diameter of the first projection lens 1a. In the opening 61a is inserted the first projection lens 1a. The first projection lens 1a is press-fitted and fixed onto a suppressing plate 8 for the first projection lens by crushing the O-ring 7b.

However, in place of the elastic body 20 and the O-ring 7, the liquid crystal display element 2 and the first projection lens 1a may be fixed and sealed by use of adhesive, putty, curable resin and so on. Having such structure, it does not happen that the holding member 6 interrupts the light path of a display light passing through the display pixel region of the liquid crystal display element 2.

Further, the holding member 6 is formed as a so-called two piece structure with holding portions 61 and 62, and the connecting portion of those come to be in condition of being sealed liquid-tightly by crushing the O-ring 7a. In this way, with such the structure of making the holding member from a plurality pieces thereof, it is possible to make a volume of the space in which the cooling medium 5 is sealed large, irrespective of the sizes of the incident side opening 62a and the exit side opening 61a of the holding member 6, and of an optical distance from the liquid crystal display element 2 up to the first projection lens 1a. It is also possible to make the holding member a one piece structure, of course, to simplify the structure of the liquid crystal display portion 11.

On the holding portion 61 is fixed the pressure adjusting bellows 9 with the pressing plate 10 for the pressure adjusting bellows. With this pressure adjusting bellows 9, the voluminous change of the cooling medium 5 due to change in temperature thereof is absorbed by expansion and shrinkage of that pressure adjusting bellows 9, thereby, maintaining the pressure of the cooling medium 5 constant.

The exit side polarizing element 3b is fixed onto the holding portion 61 by the exit side polarizing element holding frame 4b. This exit side polarizing element holding frame 4b is so shaped that it will not obstruct a convection current of the cooling medium, and also the optical path well as.

A part of the heat generated by the liquid crystal display element 2 is transmitted through the elastic body 20 to the holding member 6, and is radiated to an outside of the liquid crystal display portion 11. Almost of the heat remaining is absorbed into the cooling medium 5 and moves following the natural convection current of the cooling medium 5. Then, it is transferred to an interior wall surface of the holding member 6 to be radiated outside. Almost of the heat generated in the exit side polarizing element 3b is absorbed by the cooling medium 5 and is radiated outside.

In this manner, the holding member 6 has a role of radiating the heat generated in the liquid crystal display portion 11 outside. With provision of the radiation fin 19 on an external wall of the holding member 6, an efficiency of the radiation can be increased. In a case of the heat radiation by the natural convection current of the air, it is preferable that the heat radiation surface of the heat radiator fin 19 is disposed almost in parallel with a vertical direction. However, though the heat radiator fin 19 is provided on the holding portion 61 in the figure, it can be provided on the another holding portion 62 or on both holding portions 61 and 62. With compulsive cooling of the holding member 6 by means of a cooling fan and so on, the efficiency of the heat radiation can be increased much more. In this case, it is preferable that the heat radiator fin 19 is so disposed that the heat radiating surface thereof is about in parallel with the direction of the air flow by the cooling fan. Further, in a case where the cooling is performed by the natural convection current as in the present embodiment, a low noise cooling can be achieved without generation of noise from the fan and so on.

A part of the heat generated in the exit side polarizing element 3a is heat-exchanged into a periphery portion through contact thermal conduction, and a part of the remaining is heat-exchanged between a peripheral atmosphere. Compulsive cooling is also applicable by causing an air current upon the surface of the incident side polarizing element 3a with use of such the cooling fan.

Furthermore, it is also possible to accelerate or improve the heat radiation to an outside of the liquid crystal display portion 11 through the contact thermal conduction, by using the structure made of the material of good thermal conductivity, such as a metal, Fe, Al and the like, or materials containing them therein, for holding and fixing the liquid crystal display portion 11 as a whole.

In the present embodiment, since at least an incident side portion of the liquid crystal display element 2 faces an outside of the holding member 6, and an electrical connection between the liquid crystal display element 2 and the signal line 18 for driving the liquid crystal display element is provided in an outside of the holding member 6, thereby prohibiting that electrical connection and the liquid crystal display element driving signal line 18 from touching on or contacting with the cooling medium 5. Because of this, there is no necessity of a measure for protecting from encroachment or corrosion by the cooling medium 5.

Further, the exit surface of the liquid crystal display element 2 is in non-contact with the peripheral atmosphere (outside air), therefore, without the adhesion of dust in the peripheral atmosphere (outside air) onto the exit surface of the liquid crystal display element 2, no shadow is cast on the projection picture.

However, the exit side polarizing element 3b is not necessarily to be in a one piece as in the present embodiment, it can be constructed with a plurality of pieces thereof, and even in a case where a portion of the plurality of pieces is attached onto the liquid crystal display element 2, the effect of the present invention is still effective.

In the construction mentioned in the above, as shown in FIG. 3, the light emitted from the light source 12 is condensed into the multiple lenses 14 and 15 by the reflection mirror 13. Here, the multiple lenses 14 and 15 function of entering the light into the liquid crystal display element 2 equally over a whole surface of the display pixel region thereof, thereby enabling an equal brightness on the screen 16. The light passing through the multiple lenses 14 and 15, after being converted into a polarized light which is almost in parallel to the polarization direction of the incident side polarizing element 3 through the polarization conversion element 17, is incident upon the liquid crystal display portion 11. Then, the light incident upon the liquid crystal display portion 11 is adjusted in darkness (i.e., bright or dark) for each of the pixels corresponding to the picture to be displayed in the liquid crystal display portion, and is then projected, through the group of the projection lenses constructing the projection means, on the screen 16.

In the polarization conversion element 17, by obtaining the polarized light almost in parallel to the polarization direction of the incident side polarizing element 3, the permeability in the incident side polarizing element 3a is increased, and the emitted light of the light source 12 reaches to the liquid crystal display element 2 with good efficiency. Further, in the incident side polarizing element 3a, since an amount of the light being absorbed therein, the heat generation becomes small.

As is explained in the above, according to the present embodiment, the suppression of decrease in the contrast of the projection picture can be achieved. As a result of this, the projection picture of high brightness can be obtained. Further, the increase in the temperature of the liquid crystal display element 2 and the exit side polarizing element 3b can be suppressed. Furthermore, since the other special optical elements are not necessitated, simplification of the liquid crystal display portion 11 can be achieved. Moreover, without using a heat pipe, the cooling can be performed with a simple structure.

Next, an explanation will be given on an another embodiment of the liquid crystal display portion 11 which is applied to the single-plate type liquid crystal projector, by referring to FIGS. 4 through 6. However, in the drawings used in the bellow, the structural elements which have the same functions as those in the first embodiment are attached with the same reference numerals. Further, the liquid crystal display portion 11 in the below is also applied to the single-plate type liquid crystal projector shown in FIG. 3.

Figure 4:
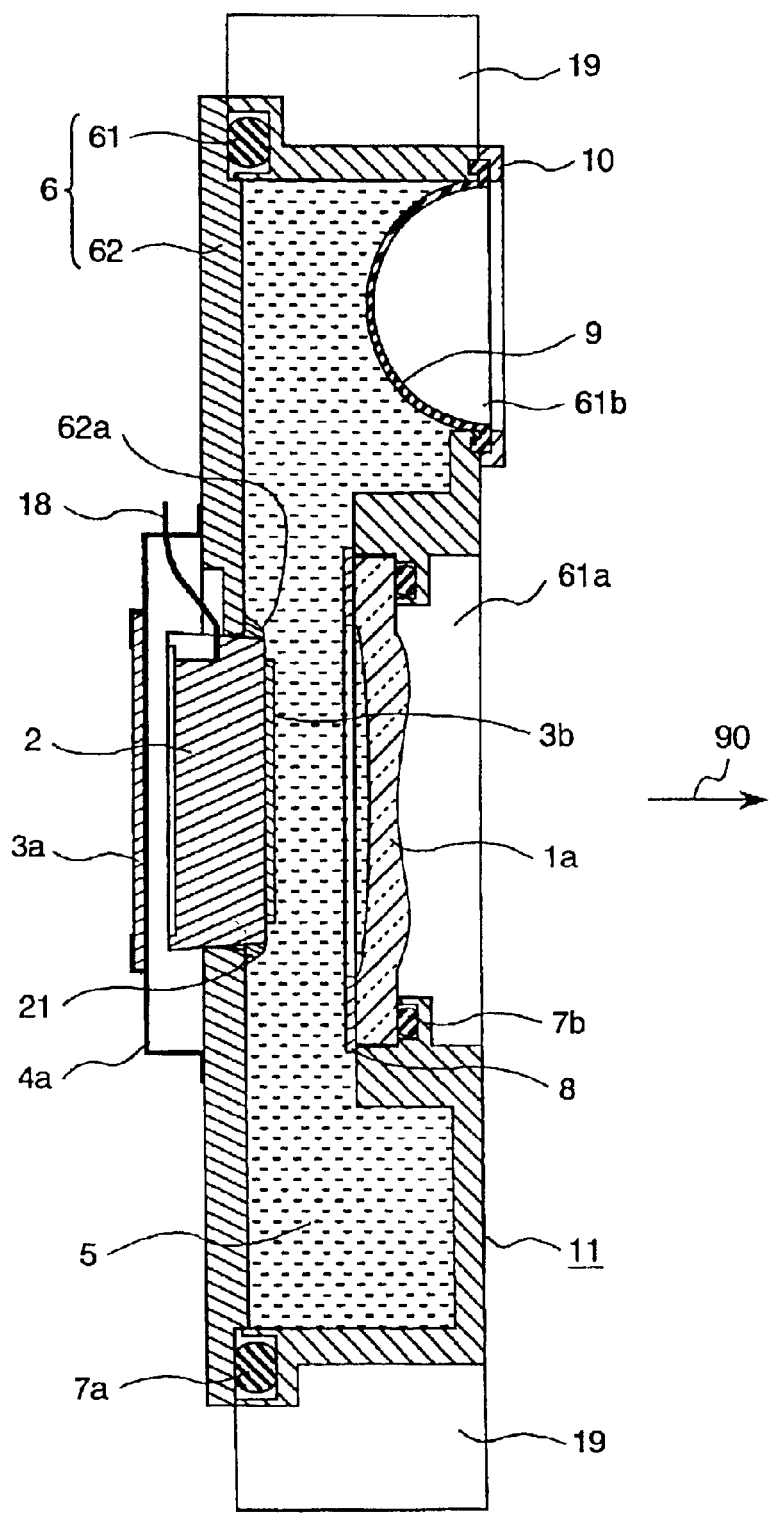
FIG. 4 is a cross-section view of showing structural elements of a liquid crystal display portion in accordance with a second embodiment of the present invention.

FIG. 4 is the cross-section view of showing each element or portion of the liquid crystal display portion according to the second embodiment of the present invention.

The present embodiment differs from the first embodiment in an aspect that the exit side polarizing element 3b is fixed onto the exit surface of the liquid crystal display element 2. This enables a structure, in which a penetrating axis of the polarized light at the exit side polarizing element 3 is positioned in advance, with high accuracy relating to the liquid crystal display element 2, and then is fixed. Because of this, the permeability or transmittance when displaying white in total and a shielding ratio when displaying black in total are improved, thereby obtaining high contrast.

Further, in the present embodiment, when the liquid crystal display element 2 is inserted into the opening 62a, the connecting portion with the holding portion 61 is sealed by the adhesive 21.

Figure 5:
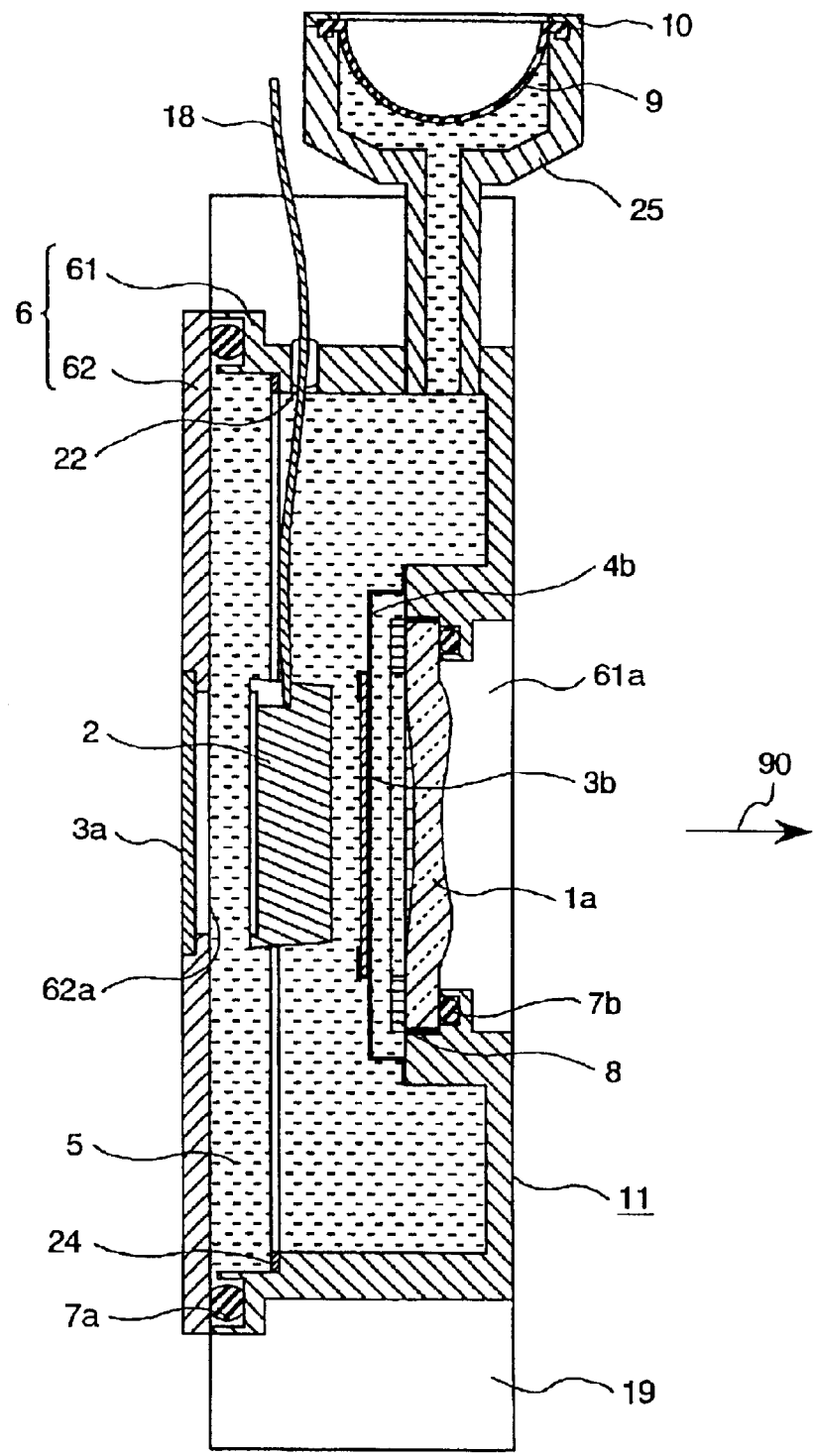
FIG. 5 is a cross-section view of showing structural elements of a liquid crystal display portion in accordance with a third embodiment of the present invention.

FIG. 5 is the cross-section view of showing each element or portion of the liquid crystal display portion according to the third embodiment of the present invention.

The present embodiment differs from the first embodiment in aspects that the cooling medium 5 is filled up within a region from the exit surface of the incident side polarizing element 3a up to the incident surface of the first projection lens 1a, and that the liquid crystal display element 2 is disposed in the cooling medium 5.

In FIG. 5, a reference numeral 24 indicates a liquid crystal display element holding frame for positioning and holding the liquid crystal display element 2 in the cooling medium 5, 25 a cooling medium pressure adjusting chamber, and 22 a signal line extending opening being provided for extending the liquid crystal display element driving signal line 18 outside the holding member.

The incident side polarizing element 3a is positioned so as to close the opening 62a which is formed at the incident side of the holding portion 62, i.e., an incident opening. Further, the connecting portion between the holding member 62 is sealed with adhesive, putty, O-ring and so on. The cooling medium 5 is filled up within the space surrounded by the incident side polarizing element 3a, the holding member 6, the pressure adjusting bellows 9 and the first projection lens 1a.

The liquid crystal display element 2 is supported by the liquid crystal display element holding frame 24 and is disposed in the cooling medium 5. Here, the region in which the cooling medium 5 is filled up with is connected with liquid crystal display element 2 at the incident surface side and the exit surface side thereof, and the cooling medium 5 can flow between both regions freely with the convection current.

The liquid crystal display element driving signal line 18 is extended from the signal line extending opening 22 to an outside of the holding member 6. The signal line extending opening 22 is sealed by filling up with the adhesive or the curable resin, or by press-fitting of elastic body. With the seal portion being formed in this manner, the liquid crystal display element driving signal line 18 can be extended or led out to an outside of container.

The cooling medium pressure adjusting chamber 25 being provided with the pressure adjusting bellows 9 is communicated with the inside of the holding portion 61 and thereby maintains the pressure of the cooling medium 5 constant. By diving the cooling medium pressure adjusting chamber 25 and the holding portion 6 into separate parts, the holding portions 61 and 62 can be small-sized.

In this manner, according to the present embodiment, since both the incident surface and the exit surface of the liquid crystal display element 2 are contact with the cooling medium 5 directly to be cooled, the rise-up of temperature of the liquid crystal display element 2 can be reduced down much more. Also the heat generation in the incident side polarizing element 3a can be cooled down by the cooling medium 5. Further, the both surfaces of the liquid crystal display element 2 is in non-contact with the peripheral atmosphere (outside air), therefore, without the adhesion of dust in the peripheral atmosphere (outside air) onto the exit surface of the liquid crystal display element 2, no shadow is cast on the projection picture.

Figure 6:
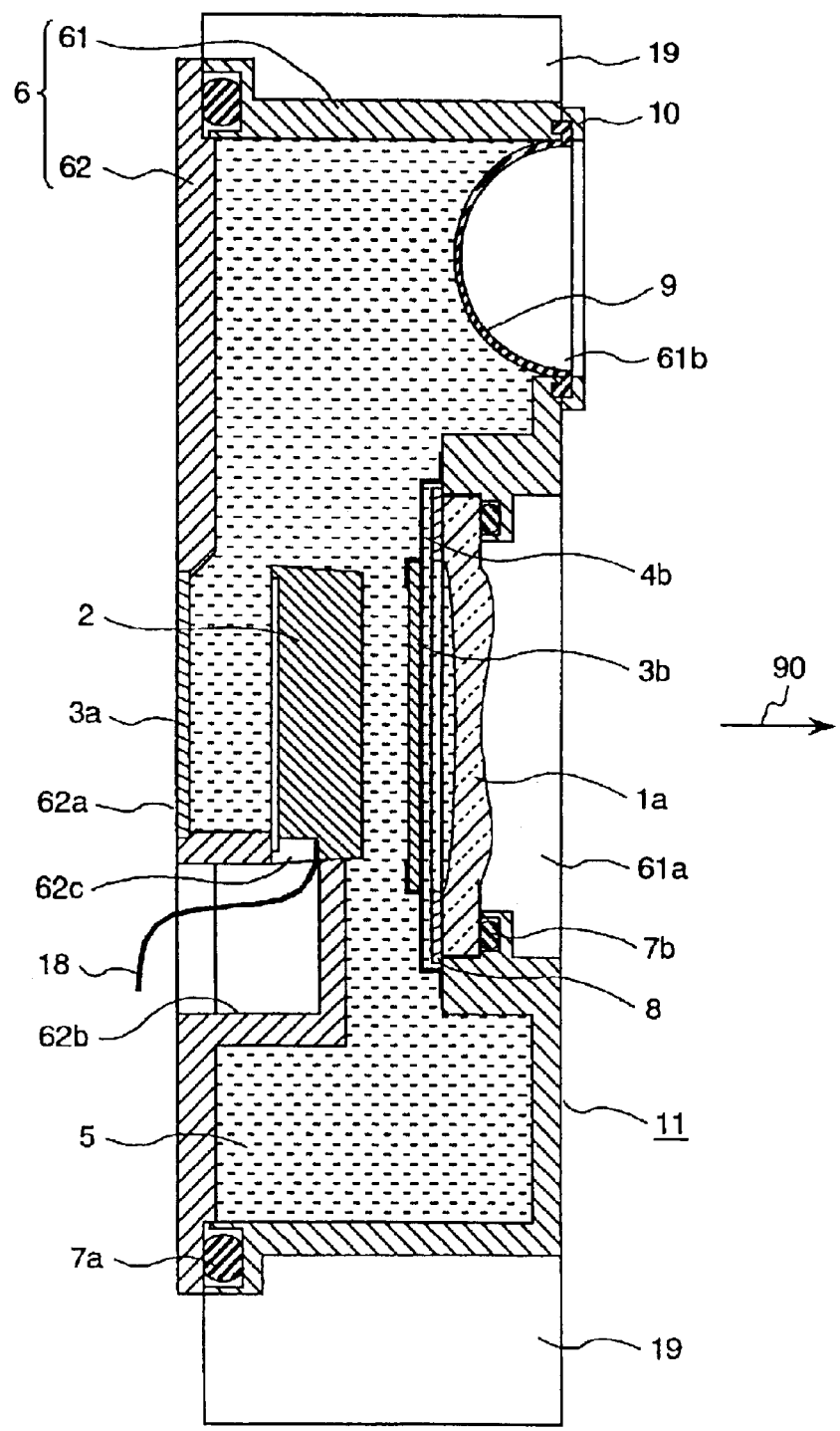
FIG. 6 is a cross-section view of showing structural elements of a liquid crystal display portion in accordance with a fourth embodiment of the present invention.

FIG. 6 is the cross-section view of showing each element or portion of the liquid crystal display portion according to the fourth embodiment of the present invention.

The present embodiment differs from the third embodiment in an aspects that a part including the connecting portion of the liquid crystal display element 2 with the liquid crystal display element driving signal line 18 is constructed so as to be extended to an outside of the holding member 6 in which the cooling medium 5 is filled up with.

In the holding portion 62 of the holding member 6 is formed a hollow projecting portion 62b for attaching the liquid crystal display element 2 thereon. In a part of the projecting portion 62b is formed an opening 62c. A part of the liquid crystal display element 2 is fixed into the opening 62c of the projecting portion 62b in a condition of being sealed liquid-tightly, by means of the O-ring, adhesive, putty and so on. The connecting portion between the liquid crystal display element 2 and the liquid crystal display element driving signal line 18 is located in the opening within the projecting portion, thereby not contacting with the cooling medium 5.

According to the present embodiment, in addition to the effect(s) mentioned in the third embodiment, there can be obtained an another effect that no consideration or concern is necessary for corrosion-resistance characteristic against the cooling medium 5 of the connecting portion between the liquid crystal display element driving signal line 18 and the liquid crystal display element 2, and electric leakage into the cooling medium 5 thereby.

Next, an explanation will be given on the fifth to eleventh embodiments according to the present invention, by referring to the attached drawings. Those are applied to the three (3)-plate type liquid crystal projector. Of course, there may be a case where some of them can be applied to the structure of the single-plate type. However, in the drawings which will be explained in below, each the structural elements which has the same function to that of the embodiment mentioned in the above is attached with the same reference numeral.

Figure 9:
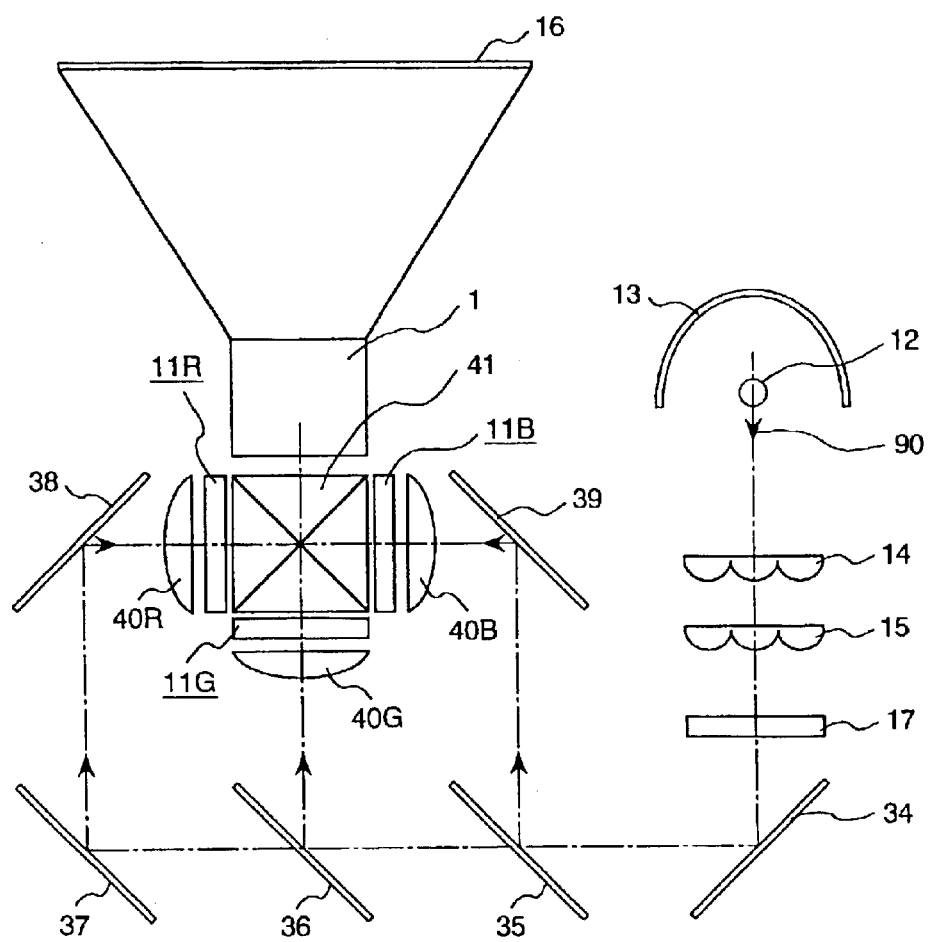
FIG. 9 is a view of showing an optical system of a three (3)-plate type liquid crystal projector as a whole, relating to the fifth embodiment of the present invention.

FIG. 9 is the view of showing the entire structure of an optical system of the three (3)-plate type liquid crystal projector according to the present embodiment.

The three (3)-plate type liquid crystal projector comprises liquid crystal display portions 11R, 11G and 11B corresponding to the respective R, G and B, the light source 12 of such as the metal halide lamp, the reflection mirror 13 for condensing the light emitted from the light source 12 into a constant direction, the multiple lenses 14 and 15 constructed by assembling a large number of cell lenses, the polarization conversion element (polarization conversion means) 17, a group of mirrors 34–39 constructing an optical separation system for dividing the polarized light into three (3), thereby separating the incident light into each of the components, R, G and B, condenser lenses 40R, 40G and 40B for condensing the incident lights of the respective components, R, G and B upon the liquid crystal display portions 11R, 11G and 11B, an optical composing element 41 for composing or synthesizing the light emitted from the liquid crystal display portions 11R, 11G and 11B, and the projection lens 1 for projecting the composed or synthesized image on the screen 16.

Here, the optical light source system is constructed with those from the light source 12 up to the condenser lenses 40R, 40G and 40B. And, the optical projection system is constructed with the optical elements, including the composing element 41, the projection lens 1 and so on.

Next, an explanation will be given on a fifth embodiment of the present invention, by referring to FIGS. 8 and 7.

Figure 8:
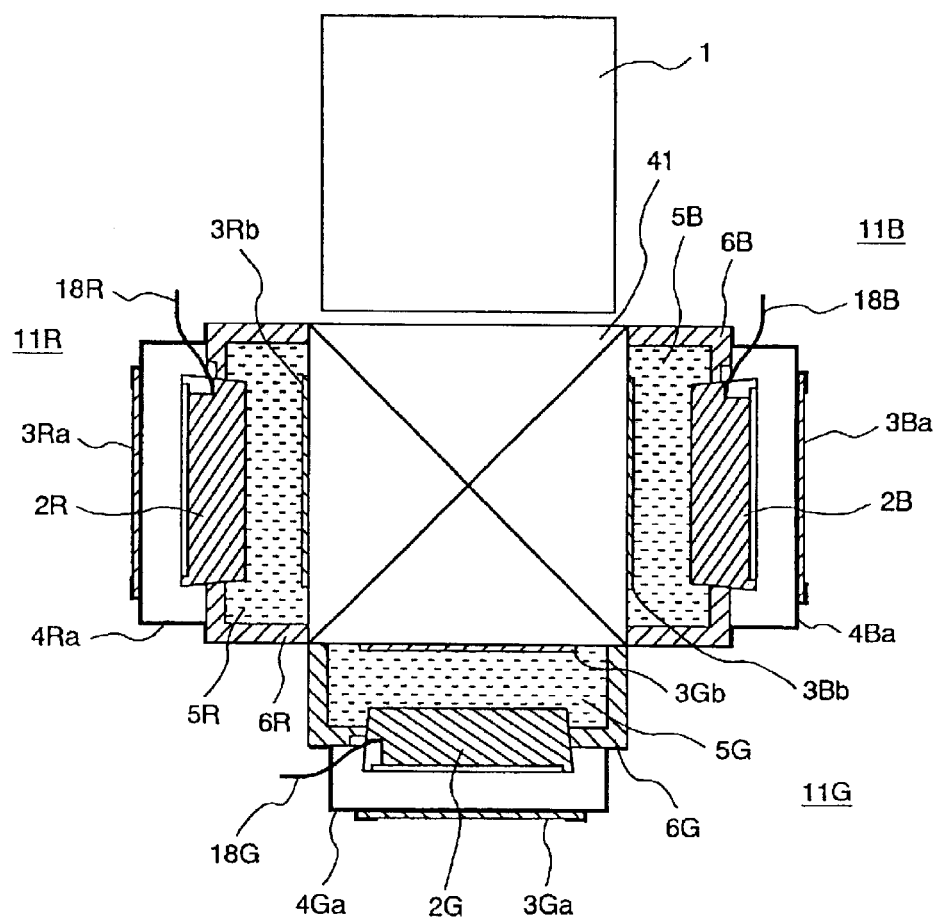
FIG. 8 is a view of showing structure at periphery of the liquid crystal display portion in the fifth embodiment of the present invention.

FIG. 8 is a view of showing the construction in which the liquid crystal display portions 11 are provided corresponding to each of color components (R, G, B). However, in the figure, the heat radiator fin 19 and the pressure adjusting chamber 25 are omitted to be shown therein.

In FIG. 8, the liquid crystal display portions 11R, 11G and 11B comprises the liquid crystal display elements 2R, 2G and 2B, the incident side polarizing elements 3Ra, 3Ga and 3Ba, the exit side polarizing elements 3Rb, 3Gb and 3Bb, the incident side polarizing element holding frame 4Ra, 4Ga and 4Ba for holding and fixing the incident side polarizing elements 3Ra, 3Ga and 3Ba, and the holding members 6R, 6G and 6B. However, the references 5R, 5G and 5B indicate the cooling medium. A reference 41 indicates the optical composing element and 1 the projection lens.

The liquid crystal display portions 11R, 11G and 11B are fixed onto the three incident surfaces of an optical polyhedron, i.e., the optical composing element 41. The optical composing element 41 is for composing or synthesizing the lights of respective color components passing through each of the liquid crystal display portions 11R, 11G and 11B.

The lights of the respective color components separated by the optical separation system which will be mentioned later are incident upon the corresponding liquid crystal display portions 11R, 11G and 11B, respectively, thereby being dimmed for each pixel through the liquid crystal display elements 2R, 2G and 2B. The each light dimmed, after being composed or synthesized by the optical composing element 41, is projected through the projection lens 1.

However, in the present embodiment, although the liquid crystal display portions 11R, 11G and 11B are provided corresponding to the three (3) components R, G and B, other constructions are also possible, for instance, the liquid crystal display portions 11 are corresponding to two (2) components, such as Y and C, or G and R+B, or corresponding to components equal to or more than four (4).

Figure 7:
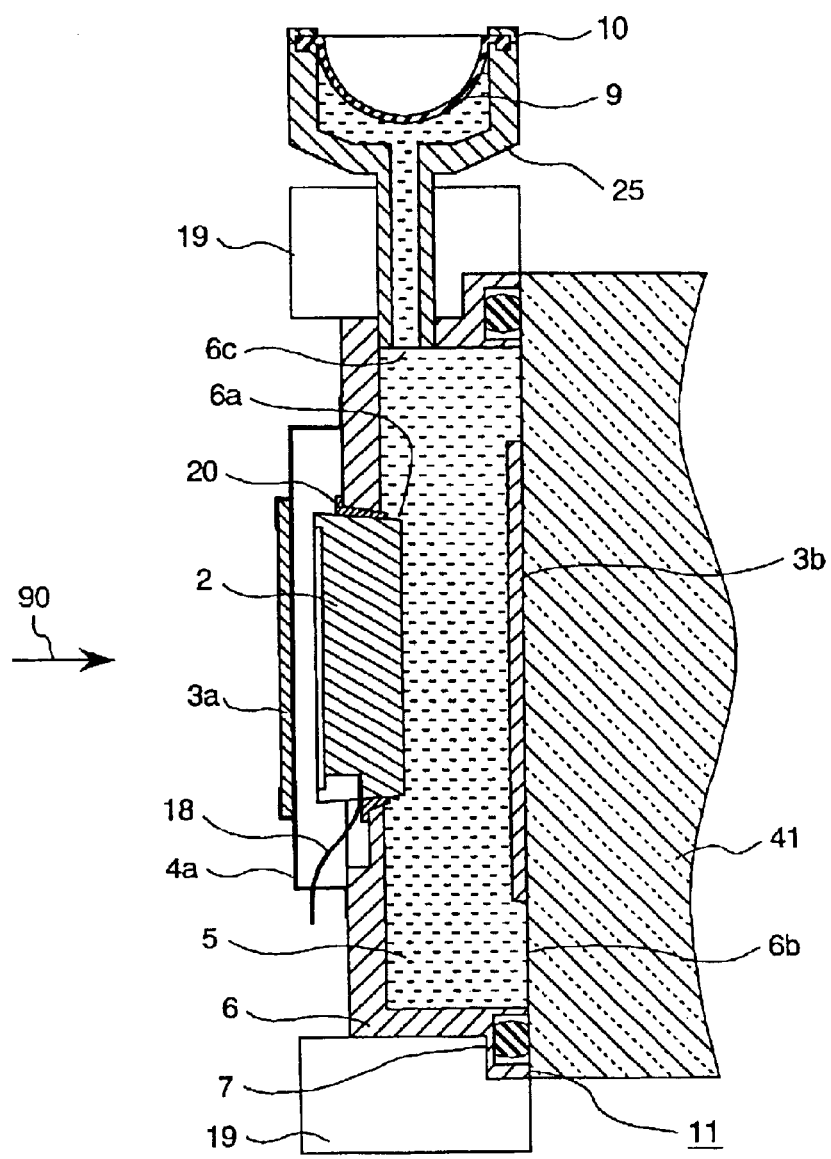
FIG. 7 is a cross-section view of showing structural elements of a liquid crystal display portion in accordance with a fifth embodiment of the present invention.

FIG. 7 is the cross-section view of showing the detailed construction of the liquid crystal display parts in the fifth embodiment of the present invention. In the three-plate type, as shown in FIG. 8, the liquid crystal display portions 11R, 11G and 11B are formed on the three incident surfaces of the optical synthesizing element. However, basically, those have the same construction to one another, therefore, here will be explained only about those only for one of the three components, R, G and B. Therefore, with the reference numerals attached, they are sometimes used without distinguishing among R, G and B. Further, the example shown in FIG. 7 can be applied not only to that of the three-plate type, but also is applicable to the single-plate type.

In FIG. 7, a reference numeral 41 indicates the optical composing element of polyhedron, and 11 the liquid crystal display portion. In the present embodiment, the incident side polarizing element 3a, the liquid crystal display element 2, the exit side polarizing element 3b, and the optical composing element 41 are so disposed that they are in parallel to one another in the light penetrating or transmitting surfaces thereof.

In the present embodiment, the holding member 6 adopts the one-piece structure being formed in a concave shape. In this holding member, there are provided the exit side opening 6b as an opening of the concave portion thereof, the incident side opening 6a which is positioned at a bottom of the concave portion, and a communication opening 6c for communicating with the pressure adjusting chamber 25. The incident side opening 6a is inserted and sealed with the liquid crystal display element 2. In more detail, into the incident side opening 6a is inserted the liquid crystal display element 2, and the elastic body 20 is press-fitted into the aperture between them. Further, the exit side opening 6b is closely contacted and sealed with the optical synthesizing element 41. In more detail, the exit side opening 6b is covered with one of the incident surfaces of the optical composing element 41, and is fixed to the optical composing element 41 through the O-ring 7. Both the incident side opening 6a and the exit side opening 6b are in such the sizes that they will not interrupt the incident light and the exiting light of the liquid crystal display element 2 therewith.

The holding member 6 is, as mentioned previously, made of the material of good thermal conductivity, such as, Fe, Cu, Al, Mg and so on, or materials containing them therein and being superior in the thermal conductivity thereof, thereby carrying the role of heat radiation by itself. However, as the means for fixing the liquid crystal display element 2 and the optical composing element 41 onto the holding member 6, such the adhesive, putty or curable resin can be used in place of the elastic body 20 and/or the O-ring 7.

Upon the incident surface of the optical composing element 41 are fixed the exit side polarizing element 3b through the adhesive or a both-sided adhesive tape, or the like. The exit incident side polarizing element 3a is positioned with a constant distance between the liquid crystal display element 2, and is supported by the incident side polarizing element holding frame 4a. Here, the incident side polarizing element holding frame 4a is in such shape that it will not interrupts the incident light upon the liquid crystal display element 2.

The pressure adjusting chamber 25 is communicated with an inside of the holding member 6, and is attached with the pressure adjusting bellows 9 through the pressure adjusting bellows pressing plate 10. The space, which is surrounded by the liquid crystal element 2, the holding member 6, the pressure adjusting chamber 25, the pressure adjusting bellows 9 and the optical composing element 41 attached with the exit side polarizing element 3b, is in a condition of being sealed liquid-tightly, and is filled up with the cooling medium 5 therein. With such the structure, the liquid crystal element 2 and the exit side polarizing element 3b are held under the condition that they contact with the cooling medium 5.

On the cooling medium pressure adjusting chamber 25, the pressure adjusting bellows 9 is fixed by the pressure adjusting bellows pressing plate 10. The space which is surrounded by the liquid crystal display element 2 and the optical composing element 41, and the space which is surrounded by the cooling medium pressure adjusting chamber 25 and the pressure adjusting bellows 9, are communicated to each other, the cooling medium 5 is in a condition of being movable therebetween. The voluminous change of the cooling medium 5 due to the change of temperature is absorbed by the expansion and shrinkage or deformation of the pressure adjusting bellows 9. Thereby, the pressure in the holding member 6 is maintained constant.

A part of the heat generated in the liquid crystal display element 2 is transferred through the elastic body 20 to the holding member 6, and is discharged outside the liquid crystal display portion 11. Almost of the rest of the heat generated is absorbed into the cooling medium 5, and is moved following the convection current of the cooling medium 5. Then, it is transferred to the internal wall surface of the holding member 6 to be discharged outside. In the same manner, almost of the heat generated in the exit side polarizing element 3b is also absorbed into the cooling medium 5 to be discharged outside.

In this way, the holding member 6 has the function of discharging the heat generated in the liquid crystal display portion 11 by itself. Therefore, it does not need a cooling mechanism, such as the heat pipe, then is simple in the construction thereof.

With provision of the heat radiator fin 19 on the outer wall of the holding member 6, it is possible to increase an efficiency of heat radiation. In a case where the heat radiation is performed with the natural convection current of the air, it is preferable that the heat radiator fin 19 is so disposed that the heat radiating surfaces thereof are almost in parallel to the vertical direction, in particular. With the compulsive cooling of the holding member 6 through the cooling fan or the like, the efficiency of heat radiating can be increased, much more. In this case, it is preferable that the heat radiator fin 19 is disposed so that the heat radiating surfaces thereof are almost in parallel to the direction of the air flow of the cooler fan.

A part of the heat generated in the incident side polarizing element 3a is transferred to the periphery portion through contact thermal conduction, and a part of the rest of it is heat-exchanged between the peripheral atmosphere. By causing the air flow upon the surface of the incident side polarization element 3a with use of the cooling fan, it may be cooled, compulsively.

As the structural material (not shown in the figure) for holding and fixing the liquid crystal display portion 11, the material of good thermal conductivity, such as, Fe, Al and so on, or the materials containing them, and being superior in the thermal conductivity may be used, thereby accelerating the heat radiation to the outside of the liquid crystal display portion 11 through the contact thermal conduction.

In the present embodiment, since at least the incident side portion of the liquid crystal display element 2 faces to the outer portion of the holding member 6, the electrical connection between the liquid crystal display element 2 and the liquid crystal display element driving signal line 18 is provided outside the holding member 6, thereby prohibiting the electrical connection and the liquid crystal display element driving signal line 18 from contacting with the cooling medium 5. Therefore, there is no necessity for a measure of protecting from the encroachment or corrosion by the cooling medium 5.

Further, the exit surface of the liquid crystal display element 2 is in non-contact condition with the peripheral atmosphere (outside air), therefore, no dust in the peripheral atmosphere attaches upon the surface at the exit side of the liquid crystal display element 2, thereby no shadow thereof is projected on the projected picture.

However, the exit side polarizing element 3b is not necessary to be the one piece as in the present embodiment, and can be constructed with a plurality of pieces thereof, and the effect of the present invention is still effective, even in a case where only a part of the plural pieces are attached onto the liquid crystal display element 2.

In the construction in the above, as shown in FIG. 9, the light emitted from the light source 12 is condensed to the multiple lenses 14 and 15 by the reflection mirror 13. Here, the multiple lenses 14 and 15 have the function of entering the light over the total area of the display pixel region of the liquid crystal display elements 2R, 2G and 2B, equally, thereby enabling the uniform brightness over the screen 16. The light passing through the multiple lenses 14 and 15, after being converted into the polarized light almost in parallel to the polarization direction of the incident side polarizing element 3 by the polarization converting element 17, is separated into the respective components, R, G and B, through the optical separation system 34–39. The separated components, R, G and B, through the condenser lenses 40R, 40G and 40B, are incident upon the liquid crystal display elements 11R, 11G and 11B, respectively. Then, the lights of the respective components R, G and B, which are adjusted in the darkness for each pixel in the liquid crystal display elements 11R, 11G and 11B, are projected through the projection lens 1 upon the screen 16, after being composed or synthesized in the optical composing element 41.

In the present embodiment, with use of the polarization converting element 17, an amount of light comes to be small, which is absorbed in the each incident side polarizing element 3a. With this, an amount of heat generation in each incident side polarizing element 3a is reduced down, greatly, comparing to that of the case where no such the polarization converting element 17 is used.

Further, by laying the cooling medium between the liquid crystal display element 2 and the exit side polarization element 3b, which is near to them in the refractive index thereof, the reflection can be reduced between them on the optical path, thereby realizing the high brightness while protecting from the reduction in brightness, as well as achieving the suppression in the contrast of the projected picture. Further, the liquid crystal display element 2 and the exit side polarizing element 3b are cooled by the cooling medium 5, therefore, the increase in temperature of them can be suppressed. Moreover, without necessity of the special optical elements, the simplification of the liquid crystal display portion 11 can be obtained.

Furthermore, according to the present embodiment, since the light is dimmed or adjusted on display for each one of the pixels on the screen 16, by use of the plurality of liquid crystal display elements 2, the quality of the displayed picture can be improved.

Figure 10:
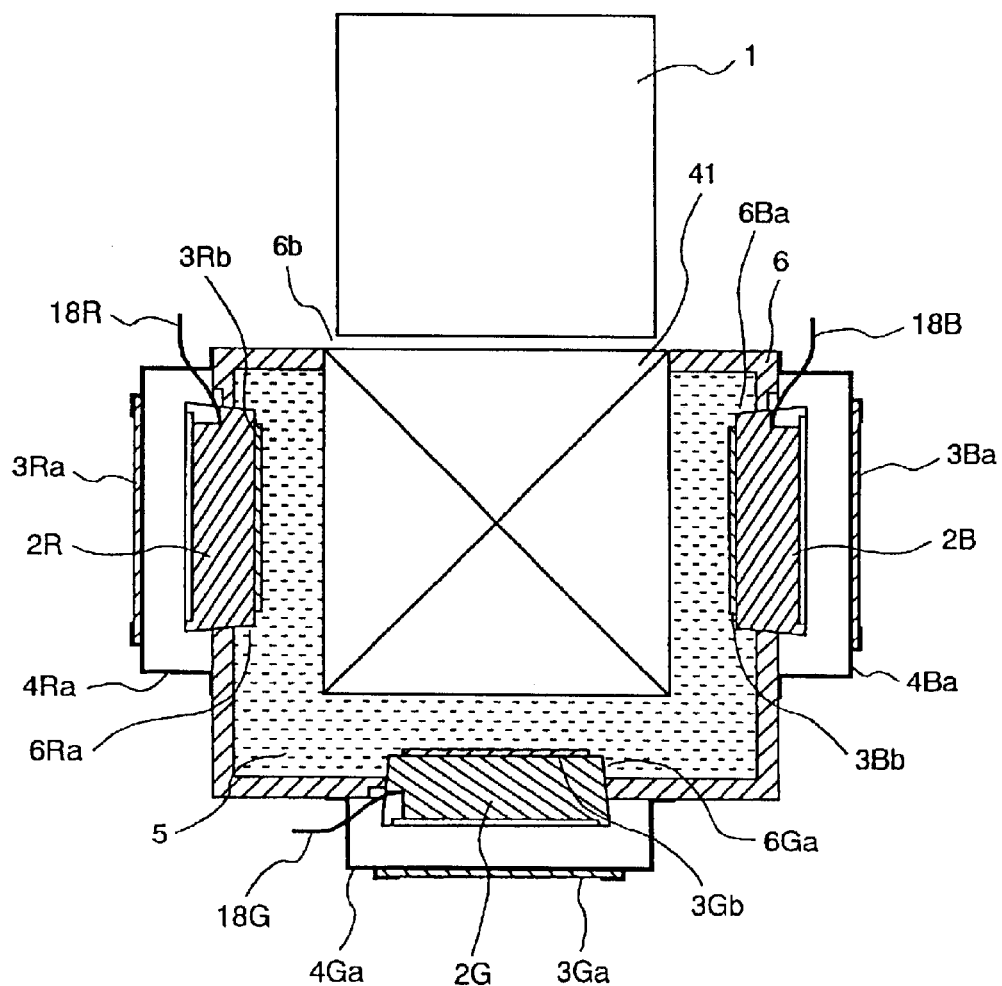
FIG. 10 is a cross-section view of showing structural elements of a liquid crystal display portion in accordance with a sixth embodiment of the present invention.

FIG. 10 is the cross-section view of showing the construction of the liquid crystal display portions at periphery of the optical composing element in the sixth embodiment of the present invention.

The present embodiment differs from the fifth embodiment in aspects that the sealed spaces of the cooling medium 5 for the respective liquid crystal display portions 11R, 11G and 11B are connected to one another, then the holding member 6 is only one for the respective liquid crystal display elements 2R, 2G and 2B, and that the exit side polarizing elements 3Rb, 3Gb, 3Bb are provided at the exit surfaces of the corresponding liquid crystal display elements 2R, 2G and 2B.

The holding member 6 is formed in box-like as a whole, in which are provided incident side openings 6Ra, 6Ga, 6Ba for inserting the respective liquid crystal display elements 2R, 2G and 2B therein, and an exit side opening 6b for inserting the optical composing element 41 therein. Within the space which is surrounded by the optical composing element 41, the holding member 6 and the plurality of the liquid crystal display elements 2R, 2G and 2B, the cooling medium 5 is filled up with.

Because of such the construction, the holding member 6 holds the exit side polarizing elements 3Rb, 3Gb, 3Bb through the respective liquid crystal display elements 2R, 2G and 2B, so as to make at least the exit side polarizing elements 3Rb, 3Gb, 3Bb contact with the cooling medium 5. Accordingly, in the present embodiment, the exit side polarizing elements 3Rb, 3Gb, 3Bb are in contact with the cooling medium 5 to be cooled, and the respective liquid crystal display elements 2R, 2G and 2B are also cooled through the exit side polarizing elements 3Rb, 3Gb, 3Bb.

In the case of the present embodiment, when the heat generation is increased in a part of the liquid crystal display elements 2 and/or the exit side polarizing elements 3, depending on the kind of the displayed picture, since this heat is dispersed into the cooling space as a whole, which is constructed with the holding member 6, by means of the convection current of the cooling medium 5, the efficiency of the heat radiation is improved.

Further, with this construction, only one of the pressure adjusting mechanism (omitted to be shown in the figure) is enough to be provided for absorbing the voluminous change of the cooling medium due to the change in temperature thereof, therefore, the apparatus itself can be simplified.

Further, in the present embodiment, the exit side polarizing elements 3Rb, 3Gb, 3Bb are fixed on the exit surfaces of the liquid crystal display elements 2R, 2G and 2B, respectively, thereby, enables a structure, in which the penetrating or transmitting axis of the polarized light in the exit side polarizing element 3 is positioned and fixed, with high accuracy relating to the liquid crystal display element 2. Because of this, the permeability or transmittance when displaying white in total, and a shielding ratio when displaying black in total are improved, thereby enabling a display of high contrast.

However, in the present embodiment, the exit side polarizing element 3 can be fixed onto the optical composing element.

Figure 11:
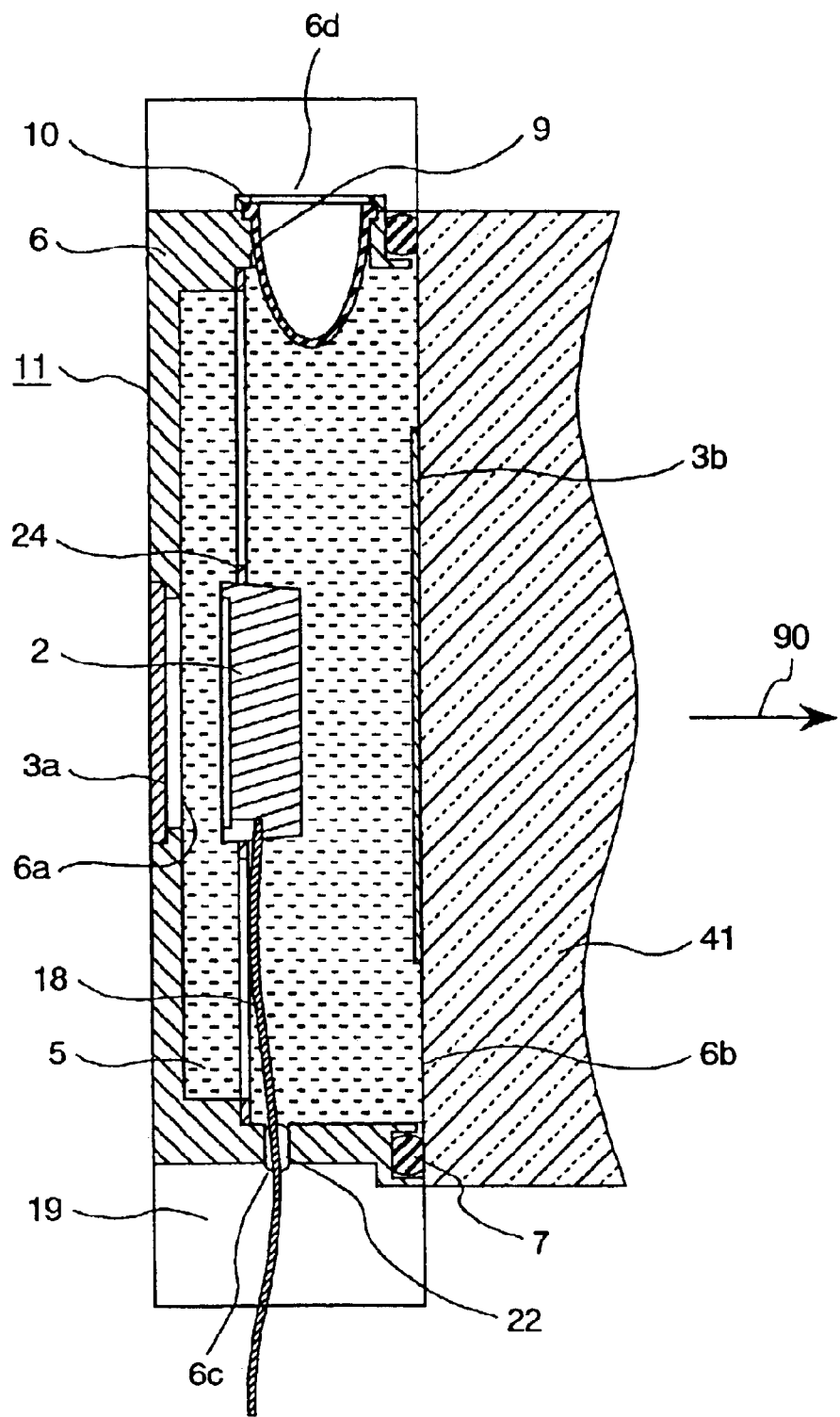
FIG. 11 is a cross-section view of showing structural elements of a liquid crystal display portion in accordance with a seventh embodiment of the present invention.

FIG. 11 is the cross-section view of showing the construction of the liquid crystal display portion 11 in the seventh embodiment of the present invention. In FIG. 11, the reference numeral 41 indicates the optical composing element, and 2 the liquid crystal display element. In the present embodiment, the incident side polarizing element 3a, the liquid crystal display element 2, the exit side polarizing element 3b, and the optical composing element 41 are so disposed that they are in parallel to one another, in particular, with the light penetrating or transmitting surfaces thereof.

In the present embodiment, the holding member 6 adopts the one-piece structure which has a concave shape. In this holding member 6 are provided the exit side opening 6b as an opening of the concave portion thereof, the incident side opening 6a which is positioned at a bottom of the concave portion, an opening 6d for the pressure adjusting bellows 9, and an opening 6e for extension of the signal line. The incident side opening 6a is inserted and sealed with the incident side polarizing element 3a. Further, the exit side opening 6b is closely contacted and sealed with the optical composing element 41. In more detail, the exit side opening 6b is covered with one of the light incident surfaces of the optical composing element 41, and is fixed to the optical composing element 41 through the O-ring 7. Both the incident side opening 6a and the exit side opening 6b are in such the sizes that the incident light and the emitting light of the liquid crystal display element 2 will not be interrupted therewith. Further, in the opening 6e is inserted the signal line 18 therethrough, and is sealed by a sealing member 22.

The liquid crystal display element driving signal line 18 is extended from the signal line extension opening 6e to an outside of the holding member 6. As the sealing member 22 for sealing the holding member 6, filling-up of the adhesive or the curable resin, or alternatively pressure-fitting of the elastic body and so on can be applied. With the sealing portion being formed in this way, it is possible to extend the liquid crystal display element driving signal line 18 to the outside of the container.

The cooling medium 5 is filled up within the space being surrounded by the incident side polarization element 3a, the pressure adjusting bellows 9 and the optical composing element 41 on which the exit side polarizing element 3b is fixed. The present embodiment differs from the fifth embodiment in an aspect that a light passage region defined from the exit surface of the incident side polarizing element 3a up to the incident surface of the exit side polarizing element 3b is filled up with the cooling medium 5, with positioning the liquid crystal display element 2 between them. However, the exit side polarizing element 3b, as is explained in FIG. 10, may be fixed onto the exit surface of the liquid crystal display element 2.

In FIG. 11, the reference numeral 24 indicates the liquid crystal display element holding frame for supporting the liquid crystal display element 2. The liquid crystal display element 2 comes to be disposed within the cooling medium 5 through the liquid crystal display element holding frame 24. Here, the region within which the cooling medium 5 is filled up is communicated with the incident surface side and the exit surface side of the liquid crystal display element 2. Thereby, it is so constructed that the cooling medium 5 can move between the both regions freely and contacts with the outside of the liquid crystal display element 2 as a whole, to be cooled down.

According to the present embodiment, since both the incident surface and the exit surface of the liquid crystal display element 2 contact with the cooling medium 5 directly to be cooled therewith, the increase in temperature of the liquid crystal display element 2 can be reduced much more. Also the heat generation in the incident side polarizing element 3a can be cooled by the cooling medium 5.

Further, since the both surfaces of the liquid crystal display element 2 are in non-contact condition with the peripheral atmosphere (outer air), no dust in the peripheral atmosphere can be attached onto the surface of the liquid crystal display element 2, nor no shadow is projected upon the projected picture.

Figure 12:
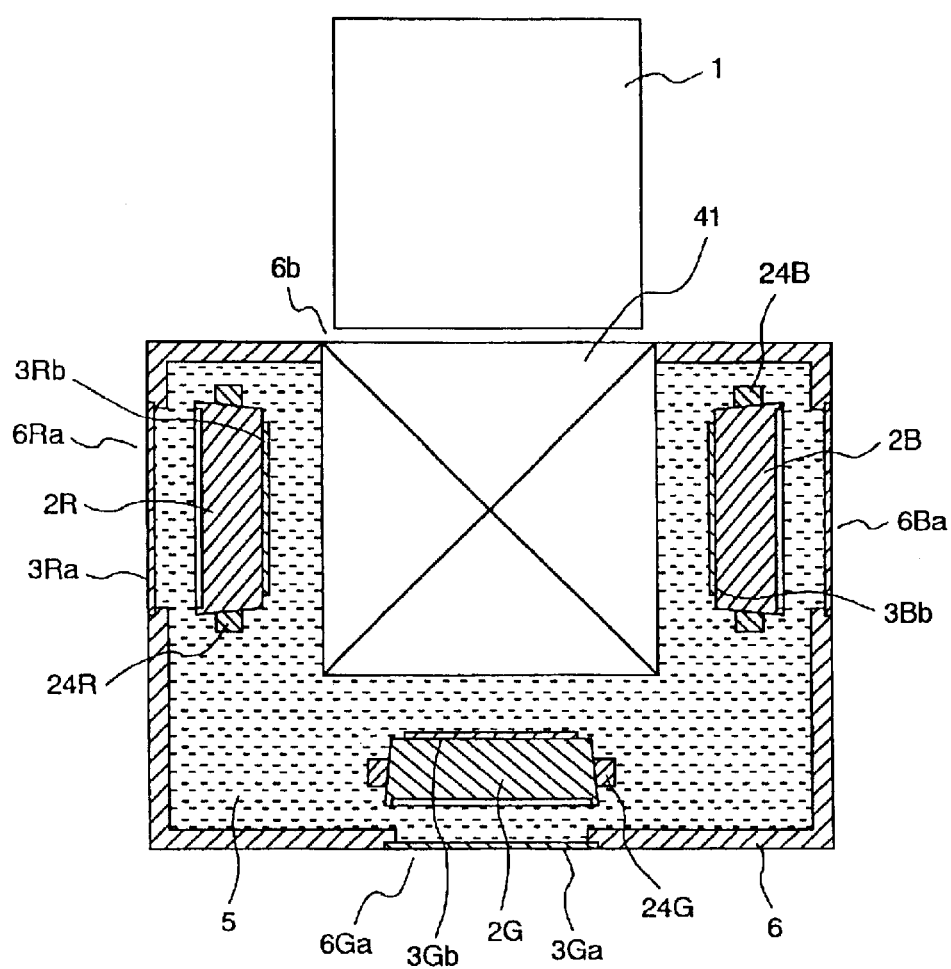
FIG. 12 is a view of showing structure at periphery of the liquid crystal display portion in the eighth embodiment of the present invention.

FIG. 12 is the cross-section view of showing the construction of the liquid crystal portion at the periphery of the optical composing element in the eighth embodiment of the present invention.

The present embodiment is characterized in that the holding member 6 in the seventh embodiment shown in the previous-mentioned FIG. 11 is in common with the three components R, G and B, as shown in FIG. 10. Namely, the holding member 6 in the present embodiment is shaped in a box-like as a whole, and in which are provided the incident side openings 6Ra, 6Ga and 6Ba for inserting the incident side polarizing elements 3Ra, 3Ga and 3Ba corresponding to the respective liquid crystal display elements 2R, 2G and 2B therein, and the exit side opening 6b for inserting the optical composing element 41 therein. Within the space surrounded by the optical composing element 41, the holding member 6, and the plurality of incident side polarizing elements 3Ra, 3Ga and 3Ba, the cooling medium 5 is filled up with.

With such the construction, the holding member 6 holds the incident side polarizing elements 3Ra, 3Ga and 3Ba, the liquid crystal display elements 2R, 2G and 2B, and the exit side polarizing elements 3Rb, 3Gb and 3Bb in such manner that they contact with the cooling medium 5 to be cooled. The liquid crystal display elements 2R, 2G and 2B, and the exit side polarizing elements 3Rb, 3Gb and 3Bb, though being omitted to be shown in FIG. 12, are supported by the liquid crystal display element holding member 24 shown in FIG. 11.

With such construction, since the cooling medium 5 can move freely between the respective liquid crystal display elements 2R, 2G and 2B, the cooling capacity or efficiency is risen up. Further, it is enough to provide only one pressure adjusting mechanism (9, 10) therein.

However, it can be so constructed that the exit side polarizing elements 3Rb, 3Gb and 3Bb are fixed onto the optical composing element 41.

Figure 13:
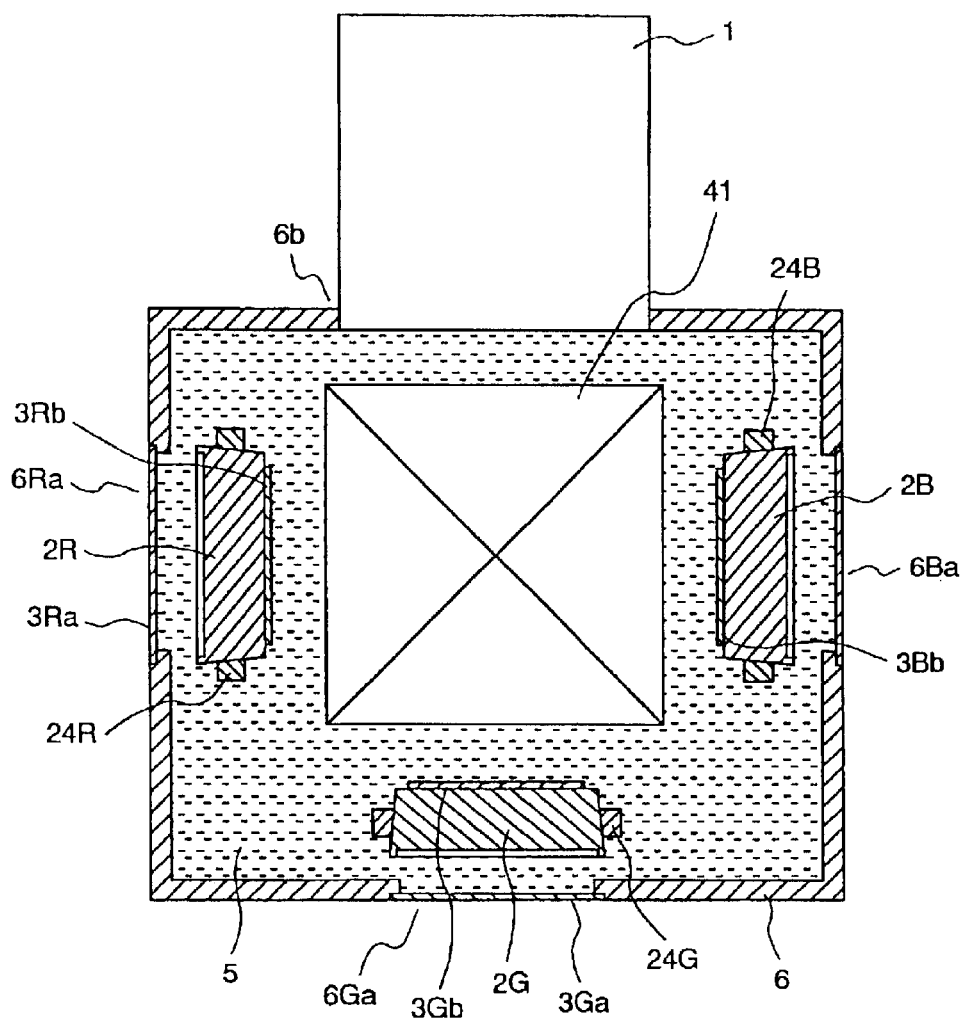
FIG. 13 is a view of showing structure at periphery of a synthetic optical element in the ninth embodiment of the present invention.

FIG. 13 is the cross-section view of showing the construction of the liquid crystal portion at the periphery of the optical composing element in the ninth embodiment of the present invention.

The present embodiment differs from the eighth embodiment in an aspect that the optical composing element 41 is positioned within the holding member 6 and the exit side opening of the holding member 6 is sealed with the first projection lens 1 constructing the projection means. The others in the construction is same to those of the eighth embodiment. In the construction of the present embodiment, the incident surface and the exit surface of the optical composing element 41 contact with the cooling medium 5 directly, and also the space between the optical composing element 41 and the first projection lens 1 is filled up with the cooling medium 5.

Next, an explanation will be given on the tenth embodiment shown in FIG. 14. The present embodiment has basically the same construction to that of the fifth embodiment shown in FIG. 7. The difference lies in that the exit side polarizing element 3a is fixed independently and that it has no pressure adjusting chamber therein.

Figure 14:
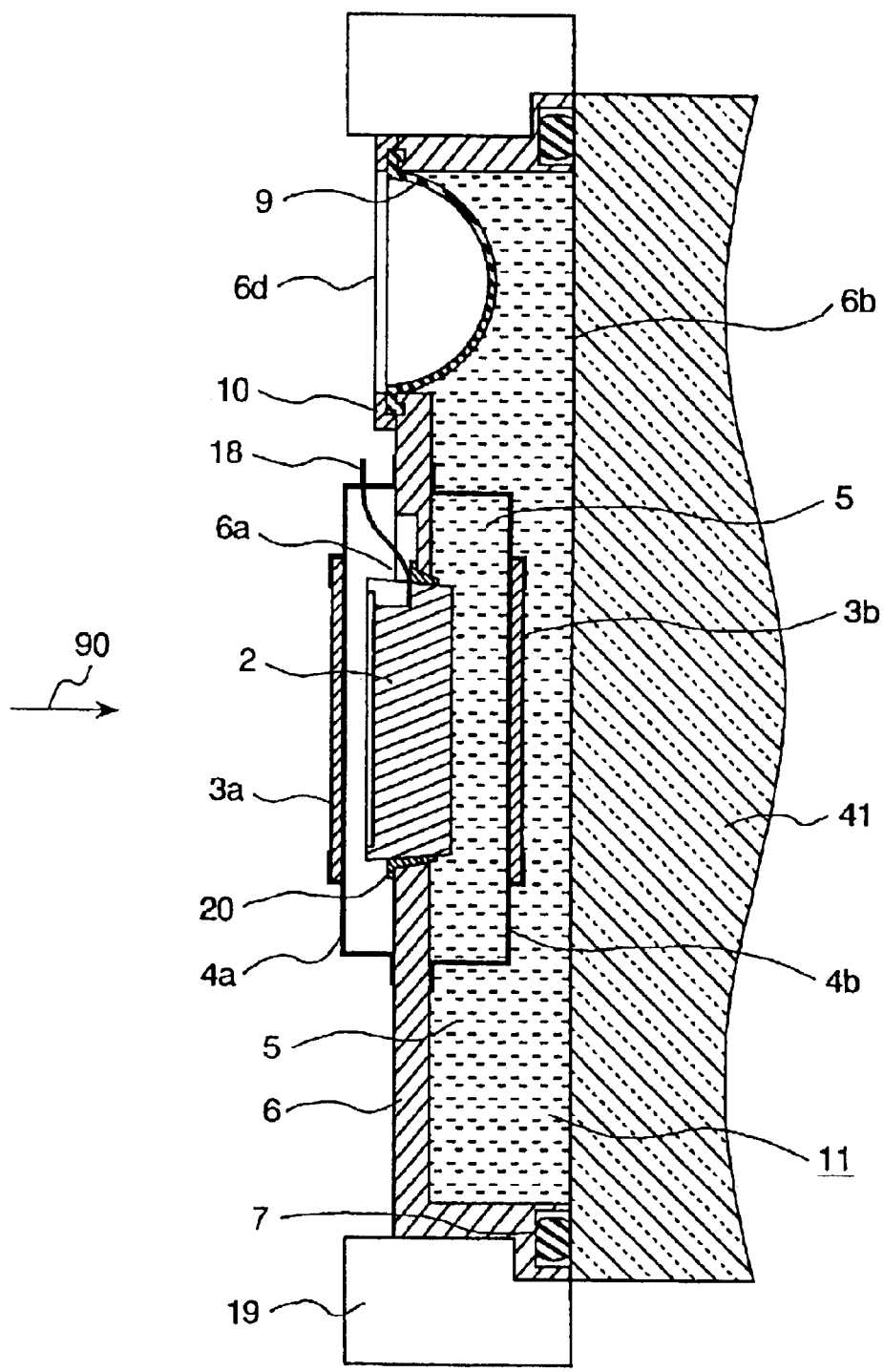
FIG. 14 is a cross-section view of showing structural elements of a liquid crystal display portion in accordance with a tenth embodiment of the present invention.

As shown in FIG. 14, in the present embodiment, the exit side polarizing element 3a, the liquid crystal display element 2, the exit side polarizing element 3b and the optical composing element 41 are so disposed that the light penetrating or transmitting surfaces of them are in parallel to one another.

In the present embodiment, the holding member 6 adopts the one-piece structure which has a concave shape. In this holding member 6 are provided the exit side opening 6b as an opening of the concave portion thereof, the incident side opening 6a which is positioned at a bottom of the concave portion, and an opening 6d for installing the pressure adjusting bellows 9 therein. The incident side opening 6a is inserted and sealed with the liquid crystal display element 2.

In more detail, into the incident side opening 6a is inserted the liquid crystal display element 2, and the elastic body 20 is press-fitted into the aperture between them. Further, the exit side opening 6b is closely contacted and sealed with the optical composing element 41. In more detail, the exit side opening 6b is covered with one of the light incident surfaces of the optical composing element 41, and is fixed to the optical composing element 41 through the O-ring 7. Both the incident side opening 6a and the exit side opening 6b are in such the sizes that they will not interrupt the incident light and the exiting light of the liquid crystal display element 2 therewith.

Further, in FIG. 14, the reference numeral 4b indicates the exit side polarizing element holding frame. The exit side polarizing element 3b is positioned at a constant distance from the liquid crystal display element 2 and the optical composing element 41, and is fixed onto the holding member 6 by the exit side polarizing element holding frame 4b. Here, the exit side polarizing element holding frame 4b has such a shape that the cooling medium 5 can move between the incident surface and the exit surface of the exit side polarizing element 3b. As a result of this, both the incident surface and the exit surface of the exit side polarizing element 3b are cooled by the cooling medium 5, thereby improving the cooling capacity or efficiency with respect to the exit side polarizing element 3b.

Further, as shown in FIG. 14, the present embodiment is so constructed that the pressure adjusting mechanism of the cooling medium 5 is unified with the holding member 6 as an unit. Namely, a bellows insertion opening 6d is provided in the holding member 6, in place of the communicating opening of the pressure adjusting chamber, and there is provided the pressure adjusting bellows 9 and is fixed by the pressure adjusting bellows pressing plate 10. With this construction, there in no necessity of the pressure adjusting chamber, then the number of the parts of the liquid crystal display portion 11, as well as the number of the manufacturing processes thereof can be cut back.

Figure 15:
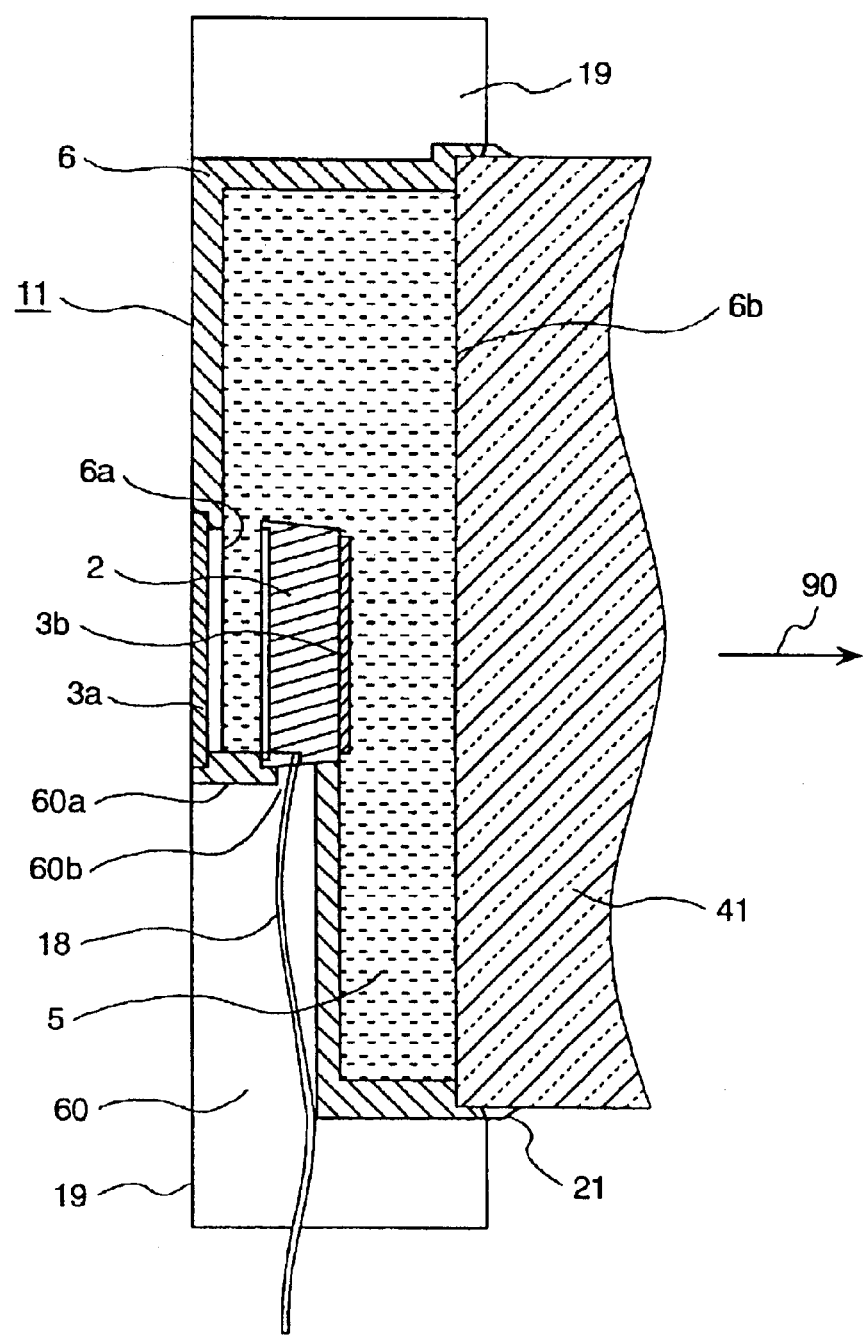
FIG. 15 is a cross-section view of showing structural elements at periphery of the liquid crystal display portion in the eleventh embodiment of the present invention.

FIG. 15 is the cross-section view of showing the construction of the liquid crystal portion in the eleventh embodiment of the present invention.

In the present embodiment, a step-like portion 60 is provided in a part of the bottom surface side of the holding member 6 of the one-piece structure, and on a wall surface 60a of the step-like portion 60 is fixed the liquid crystal display element 2. In the wall surface 60a is provided an opening so as to extend the liquid crystal display element driving signal line 18 therethrough. A part of the liquid crystal display element 2 is fixed onto the wall surface 60a of the step-like portion, by means of the O-ring, adhesive, putty and so on, in the condition of being sealed liquid-tightly. The connection between the liquid crystal display element 2 and the liquid crystal display element driving signal line 18 is so arranged that it will not contact with the cooling medium 5.

Further, at the incident side of the holding member 6 is provided the incident side opening 6a, in a vicinity of the wall surface 60a of the above-mentioned step-like portion 60. Further, the holding member is in a shape of the concave as a whole, and an opening of the concave portion forms the exit side opening 6b. In the incident side opening 6a is inserted the incident side polarizing element 3a and it seals the cooling medium 5 liquid-tightly. Further, in the exit side opening 6b, the optical composing element 41 is inserted and fixed through the adhesive 21. This adhesive 21 has also function of sealing the interior space of the holding member 6.

According to the present embodiment, in addition to the effects mentioned in the previously-mentioned seventh embodiment, another effect can be obtained that no consideration nor measure is necessary for the corrosion resistance at the connection between the liquid crystal display element driving signal line 18 and the liquid crystal display element 2 against the cooling medium 5, electric leakage to the cooling medium 5, and so on.

Further, in the present embodiment, the optical composing element 41 is so constructed that it is fixed onto the wall surface 60a of the step-like portion of the holding member 6, therefore, it is easy to position the liquid crystal display element 2 and/or the other optical elements which are assembled on the holding member 6 relating to the optical composing element 41. Because of this, a work, such as fitting the optical axis of the optical composing element 41 to that of the other optical elements, and so on, comes to be easy to perform.

As is fully mentioned in the above, according to the various embodiments of the present invention, the exit side polarizing element 3b contact with the cooling medium 5 to be cooled, thereby the heat generation in it is cooled down effectively. Further, with the liquid crystal display portion 2, it is cooled by the cooling medium 5 directly or indirectly through the above-mentioned exit side polarizing element 3b. Though it is most effective when the liquid crystal display element(s) is cooled by the cooling medium 5 directly, however, it also can be cooled effectively since the thermal conduction occurs all over the surface of the exit side polarizing element 3b as a whole, in a direction of the thickness thereof, even when it is cooled through the exit side polarizing element 3b.

As is mentioned in the above, according to the present invention, it is possible to achieve high brightness in the projection picture, as well as suppression of the increase in temperature of the liquid crystal display element(s) and the polarizing element(s) at the same time. Further, it is also possible to suppress the decrease in contrast. Furthermore, there can be provided the liquid crystal display apparatus which can be realized with small-sized and simplified construction.

The present invention, without deviating from the spirits or principal features thereof, can be applied to embodiments other than those mentioned in the above. Accordingly, the embodiments mentioned above are only one examples of the present invention, and they should not be interpreted restrictively. The breadth of the present invention is indicated by the pending claims, and further, all variations and modifications which are belong to the invention in the claims and the equivalents thereof are also within the breadth of the present invention.

What is claimed is:

1. A liquid crystal display apparatus, comprising:
   an optical source system for emitting projection light;
   a plurality of liquid crystal display portions, arranged to receive the projection light from said optical source system and to generate a projection picture depending upon a driver signal;
   a projection optical system arranged to compose and project the light emitted from said plurality of liquid crystal display portions towards a projection object, wherein:
   said optical source system has a light source, a light polarization conversion element for converting polarization of a light projected from said light source so as to make the light have one polarization direction, and an optical separation system for dividing the polarization-converted light and emitting the light towards said plurality of liquid crystal display portions; and said projection optical system has a first optical element arranged to compose lights emitted from said plurality of liquid crystal display portions and a second optical element for projecting the light composed, and further, each of said liquid crystal display portions comprises:
- a liquid crystal display element for generating the picture;
- an incident side polarizing element positioned at an incident side of said liquid crystal display element;
- an exit side polarizing element positioned at an exit side of said liquid crystal display element;
- a holding member arranged to hold at least the liquid crystal display element, the exit side polarizing element and said first optical element in each of said liquid crystal display portions; and
- a cooling medium, wherein either said incident side polarizing element or said liquid crystal display element, said first optical element and said holding member define a space between said liquid crystal display element and said first optical element, and said cooling medium is filled up within said space and cools at least said liquid crystal display element and said exit side polarizing element.

2. A liquid crystal display apparatus, comprising:

an optical source system for emitting projection light;

a plurality of liquid crystal display portions, arranged to receive the projection light from said optical source system and to generate a projection picture depending upon a driver signal;

a projection optical system arranged to compose and project the light emitted from said plurality of liquid crystal display portions towards a projection object, wherein:

said optical source system has a light source, a light polarization conversion element for converting polarization of a light projected from said light source so as to make the light have one polarization direction, and an optical separation system for dividing the polarization-converted light and emitting the light towards said plurality of liquid crystal display portions; and said projection optical system has a first optical element arranged to compose lights emitted from said plurality of liquid crystal display portion, and a second optical element for projecting the light composed, and further, each of said liquid crystal display portions comprises:
- a liquid crystal display element for generating the picture;
- an incident side polarising element positioned at an incident side of said liquid crystal display element,
- an exit side polarizing element positioned at an exit side of said liquid crystal display element;
- a holding member arranged to hold at least the liquid crystal display element, the exit side polarizing element and said second optical element in each of said liquid crystal display portions; and
- a cooling medium, wherein said holding member is provided in common for said liquid crystal display portions as well as in each of said liquid crystal display portions, either of said incident side polarizing element or said liquid crystal display element, said second optical element and said holding member define a space between said liquid crystal display element and said second optical element within which said cooling medium is filled; and the space is constructed as one apace as a whole for the liquid crystal display portions.

* * * * *